(12) United States Patent
Kuwahara et al.

(10) Patent No.: US 11,192,578 B2
(45) Date of Patent: *Dec. 7, 2021

(54) MOTOR DRIVE CONTROL DEVICE, ELECTRIC POWER STEERING DEVICE, AND VEHICLE

(71) Applicant: NSK Ltd., Tokyo (JP)

(72) Inventors: Masaki Kuwahara, Fujisawa (JP); Shigeyuki Uematsu, Fujisawa (JP)

(73) Assignee: NSK Ltd., Tokyo (JP)

( * ) Notice: Subject to any disclaimer, the term of this patent is extended or adjusted under 35 U.S.C. 154(b) by 203 days.

This patent is subject to a terminal disclaimer.

(21) Appl. No.: 16/666,602

(22) Filed: Oct. 29, 2019

(65) Prior Publication Data

US 2020/0062300 A1 Feb. 27, 2020

Related U.S. Application Data

(62) Division of application No. 16/073,883, filed as application No. PCT/JP2017/016522 on Apr. 26, 2017, now Pat. No. 10,501,113.

(30) Foreign Application Priority Data

May 13, 2016 (JP) .............................. JP2016-097215

(51) Int. Cl.
*B62D 6/00* (2006.01)
*B62D 5/04* (2006.01)
(Continued)

(52) U.S. Cl.
CPC .......... *B62D 5/0487* (2013.01); *B60R 16/033* (2013.01); *B62D 5/0484* (2013.01);
(Continued)

(58) Field of Classification Search
CPC ...... B62D 5/0487; B62D 6/00; B62D 15/021; B62D 5/0484; B60R 16/033;
(Continued)

(56) References Cited

U.S. PATENT DOCUMENTS 5,815,089 A * 9/1998 Katagiri ................. G01D 5/145
324/207.11
9,475,520 B2 * 10/2016 Yanai ................... B62D 5/0481
(Continued)

FOREIGN PATENT DOCUMENTS

EP 2 784 450 A1 10/2014
JP 2006-177750 A 7/2006
(Continued)

OTHER PUBLICATIONS

International Search Report (PCT/ISA/210) issued in PCT Application No. PCT/JP2017/016522 dated Jul. 18, 2017 with English translation (four pages).

(Continued)

*Primary Examiner* — Shardul D Patel
(74) *Attorney, Agent, or Firm* — Crowell & Moring LLP

(57) ABSTRACT

To provide a motor drive control device, an electric power steering device, and a vehicle which can individually diagnose abnormalities of magnetic detection elements, designed in a multisystem configuration to include at least two systems, for each system. A motor drive control device includes two systems of first and second rotation information detection function units. The first and second rotation information detection function units include first and second rotation position information detection units and first and second rotation information detection units. The first and second rotation information detection units individually diagnose their own abnormalities based on first and second (Continued)

motor rotation position signals detected by the first and second rotation position information detection units.

8 Claims, 9 Drawing Sheets

(51) Int. Cl.
    *G01D 5/244*       (2006.01)
    *G01B 7/30*        (2006.01)
    *B60R 16/033*     (2006.01)
    *B62D 15/02*      (2006.01)
    *G01D 5/14*        (2006.01)
    *G07C 5/08*        (2006.01)
    *H02P 6/16*        (2016.01)

(52) U.S. Cl.
    CPC .............. *B62D 15/021* (2013.01); *G01B 7/30* (2013.01); *G01D 5/14* (2013.01); *G01D 5/244* (2013.01); *G01D 5/24461* (2013.01); *G01D 5/24485* (2013.01); *G07C 5/0808* (2013.01); *H02P 6/16* (2013.01); *H02P 2203/05* (2013.01)

(58) Field of Classification Search
    CPC ........ G07C 5/0808; G01B 7/30; G01D 5/244; G01D 5/14; G01D 5/24485; G01D 5/24461; H02P 2203/05; H02P 6/16
    USPC ...................................................... 701/41–43
    See application file for complete search history.

(56) References Cited

U.S. PATENT DOCUMENTS 10,501,113 B2 * 12/2019 Kuwahara ................ G01D 5/14
2006/0220607 A1 * 10/2006 Imagawa ............ B62D 5/0481
                                                                    318/638
2007/0192004 A1 * 8/2007 Fukuda ................ B62D 5/0481
                                                                    701/41
2014/0336878 A1 * 11/2014 Yanai ...................... G01B 7/31
                                                                    701/41
2015/0175191 A1 * 6/2015 Harada ............. B62D 15/0235
                                                                    701/41
2015/0239496 A1 * 8/2015 Kozawa ............... B62D 5/0481
                                                                  702/151
2016/0332660 A1 * 11/2016 Sasaki ..................... B62D 6/002
2017/0259846 A1 * 9/2017 Koseki .................... H02P 27/08

FOREIGN PATENT DOCUMENTS

| JP | 2006-273155 A | 10/2006 |
|----|---------------|---------|
| JP | 2015-116964 A | 6/2015 |
| JP | 2016-55678 A | 4/2016 |
| WO | WO 2005/086355 A1 | 9/2005 |
| WO | WO 2014/148087 A1 | 9/2014 |

OTHER PUBLICATIONS

Japanese-language Written Opinion (PCT/ISA/237) issued in PCT Application No. PCT/JP2017/016522 dated Jul. 18, 2017 (four pages).
International Preliminary Report on Patentability (PCT/IPEA/409 & PCT/IPEA/416) issued in PCT Application No. PCT/JP2017/016522 dated Dec. 26, 2017, with partial English translation (14 pages).
European Office Action issued in counterpart European Application No. 17 795 961.6 dated Dec. 14, 2018 (five pages).
European Office Action issued in counterpart European Application No. 17 795 961.6 dated Feb. 20, 2019 (six pages).
German-language Supplementary European Search Report issued in counterpart European Application No. 17 795 961.6 dated Feb. 18, 2019 with English translation (four pages).

* cited by examiner

MOTOR DRIVE CONTROL DEVICE, ELECTRIC POWER STEERING DEVICE, AND VEHICLE

CROSS REFERENCE TO RELATED APPLICATIONS

This application is a divisional of U.S. patent application Ser. No. 16/073,883, filed Jul. 30, 2018, which is a 371 of International Application No PCT/JP2017/016522, filed Apr. 26, 2017, which claims priority to Japanese Patent Application No. 2016-097215, filed May 13, 2016, the disclosures of all of which are expressly incorporated by reference herein.

TECHNICAL FIELD

The present invention relates to a motor drive control device which controls driving of an electric motor based on motor rotation angle information detected by a motor rotation sensor, and an electric power steering device and a vehicle including the same.

BACKGROUND ART

A technology described in, for example, PTL 1 has been conventionally disclosed to improve the reliability of the function of detecting motor rotation angle information. This technology includes two systems of a magnetic detection element and a dedicated magnetic detection element as a magnetic sensor and uses a control unit to compare pieces of angle information obtained therefrom, compare pieces of rotation angle information calculated based on angle signals, or compare pieces of steering position information calculated based on pieces of angle information, between these two systems, to diagnose the accuracy of the output of each magnetic detection element.

CITATION LIST

Patent Literature

PTL 1: JP 2015-116964 A

SUMMARY OF INVENTION

Technical Problem

However, in the technology disclosed in PTL 1, angle signals from the two systems of magnetic detection elements, or pieces of motor angle information and steering position information obtained from the angle signals are compared with each other between the two systems to diagnose these systems as normal for a match and as abnormal for a mismatch. In other words, the magnetic detection elements are implemented in two systems, while the function of diagnosing the accuracies of the angle signals in the subsequent process, for example, are not implemented in two systems. Therefore, when a mismatch is found upon the occurrence of an abnormality in one of the magnetic detection elements, the magnetic detection element having the abnormality may fail to be identified, thus making both systems unavailable even when the other system is normal.

In view of this, the present invention has been made in consideration of such a problem to be solved in the conventional technology, and has as the object to provide a motor drive control device, an electric power steering device, and a vehicle which can individually diagnose abnormalities of magnetic detection elements, designed in a multisystem configuration to include at least two systems, for each system.

Solution to Problem

In order to solve the above problem, according to an aspect of the present invention, there is provided a motor drive control device including: an annular or disk-shaped magnet placed on a motor rotating shaft of an electric motor to be rotatable in synchronism with the motor rotating shaft and includes at least two different magnetic poles arranged alternately in a circumferential direction; at least two systems of rotation information detection function units each including a rotation position information detection unit configured to detect a magnetic flux of the magnet which changes depending on a rotation position of the motor rotating shaft as rotation position information, a motor rotation angle calculation unit configured to calculate a motor rotation angle based on the rotation position information detected by the rotation position information detection unit, and a rotation position information diagnosis unit configured to diagnose an abnormality of the rotation position information detected by the rotation position information detection unit; and a motor drive control unit configured to control driving of the electric motor based on the motor rotation angle output from the at least two systems of the rotation information detection function units, wherein the rotation position information detection unit includes a plurality of sensor elements configured to detect magnetic signals out of phase with each other as the rotation position information, and the motor drive control unit is configured to, when the rotation position information diagnosis unit diagnoses at least one of the at least two systems of the rotation information detection function units as abnormal, control driving of the electric motor based on the motor rotation angle output from another of the rotation information detection function units that is normal.

In addition, in order to solve the above problem, according to another aspect of the present invention, there is provided an electric power steering device including the motor drive control device described above.

Further, in order to solve the above problem, according to still another aspect of the present invention, there is provided a vehicle including the electric power steering device described above.

Advantageous Effects of Invention

The motor drive control device according to the present invention includes at least two systems of rotation information detection function units, each of which can diagnose an abnormality of rotation position information. Therefore, when some rotation information detection function units are diagnosed as abnormal, such rotation information detection function units having abnormalities can be identified, and the remaining normal rotation information detection function units can continuously control driving of the electric motor. In addition, since each system is configured to detect two pieces of rotation position information out of phase with each other using two sensor elements, a system having an abnormality can be more accurately identified from these two pieces of rotation position information.

An electric power steering device including the above-described motor drive control device allows highly reliable steering assist control. A vehicle including the above-described electric power steering device also allows highly reliable steering assist control.

DESCRIPTION OF EMBODIMENTS

Figure 1:
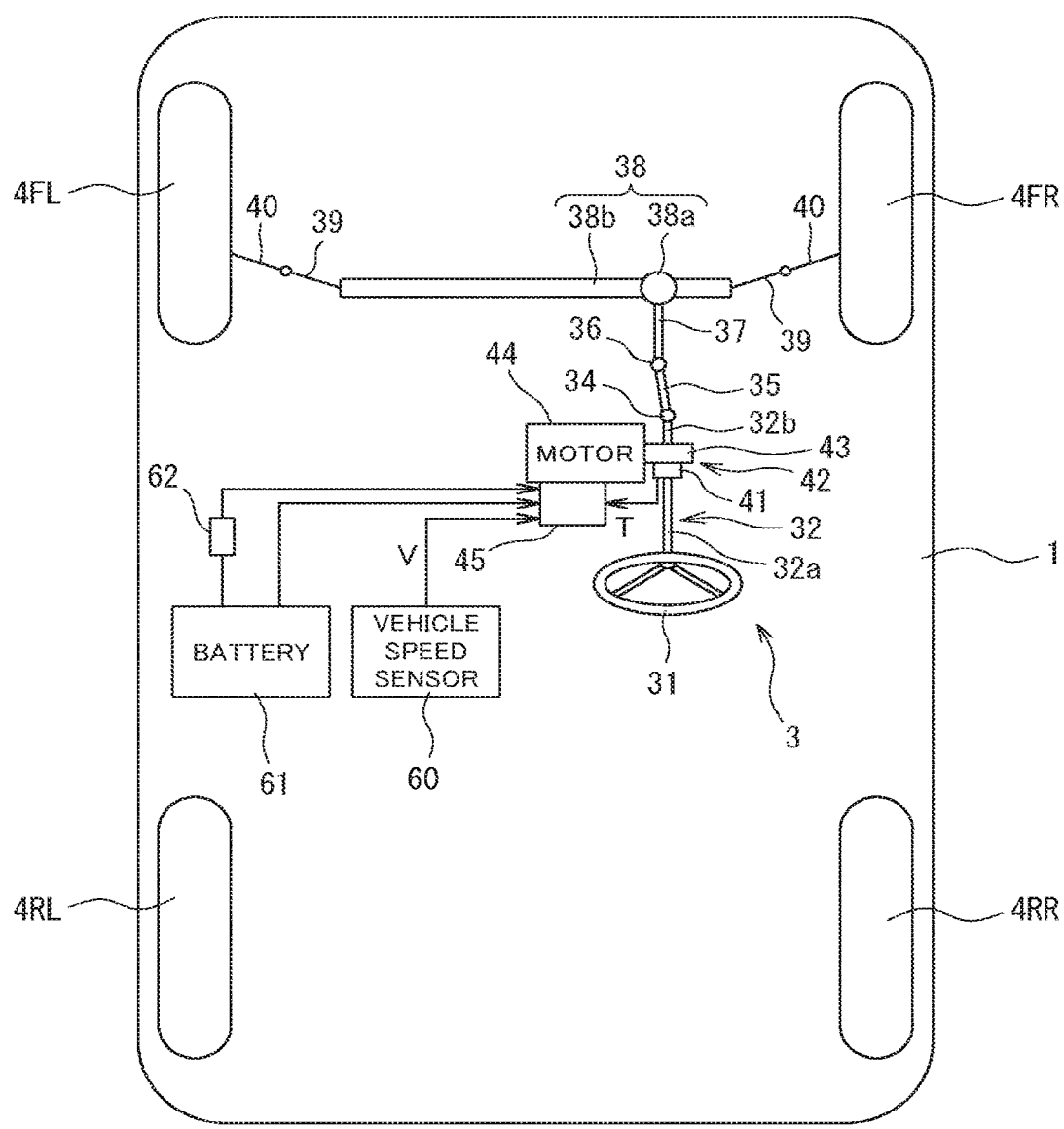
FIG. 1 is a diagram illustrating the entire configuration of an electric power steering device equipped with a motor drive control device according to a first embodiment, as applied to a vehicle.

A first embodiment and Modifications 1 to 4 of the present invention will be described below with reference to the drawings. In the following drawings, the same or similar reference numerals denote the same or similar parts. However, it should be noted that the drawings include schematic representations, and the vertical and horizontal sizes or scales of members or parts may be different from the actual ones. Accordingly, specific sizes or scales should sometimes be determined in consideration of the following description. The respective drawings include parts having different size relationships or ratios, as a matter of course.

The following first embodiment and Modifications 1 to 4 exemplify devices or methods for embodying the technical idea of the present invention, and the technical idea of the present invention does not limit, for example, the materials, shapes, structures, and arrangements of components to the following specific examples. Various changes can be made to the technical idea of the present invention within the technical scope defined by claims described in the scope of claims.

First Embodiment (Entire Configuration)

A vehicle 1 according to a first embodiment includes front wheels 4FR and 4FL serving as left and right steered wheels, and rear wheels 4RR and 4RL, as illustrated in FIG. 1. The front wheels 4FR and 4FL are turned by an electric power steering device 3.

The electric power steering device 3 includes a steering wheel 31, a steering shaft 32, a first universal joint 34, a lower shaft 35, and a second universal joint 36.

The electric power steering device 3 further includes a pinion shaft 37, a steering gear 38, tie rods 39, knuckle arms 40, and a torque sensor 41.

A steering force acting on the steering wheel 31 as the driver operates is transmitted to the steering shaft 32. The steering shaft 32 includes an input shaft 32a and an output shaft 32b. The input shaft 32a has one end connected to the steering wheel 31, and the other end connected to one end of the output shaft 32b via the torque sensor 41.

The steering force transmitted to the output shaft 32b is transmitted to the lower shaft 35 via the first universal joint 34 and further to the pinion shaft 37 via the second universal joint 36. The steering force transmitted to the pinion shaft 37 is transmitted to the tie rods 39 via the steering gear 38. The steering force transmitted to the tie rods 39 is further transmitted to the knuckle arms 40 to turn the front wheels 4FR and 4FL.

The steering gear 38 employs a rack-and-pinion system including a pinion 38a connected to the pinion shaft 37 and a rack 38b which meshes with the pinion 38a. Therefore, the steering gear 38 converts a rotational motion transmitted to the pinion 38a into a rectilinear motion in the vehicle widthwise direction in the rack 38b.

The torque sensor 41 detects a steering torque T applied to the steering wheel 31 and transmitted to the input shaft 32a.

A steering assist mechanism 42 which transmits a steering assist force to the output shaft 32b of the steering shaft 32 is connected to the output shaft 32b.

The steering assist mechanism 42 includes a reduction gear 43 implemented in a worm gear mechanism connected to the output shaft 32b, an electric motor 44 which is connected to the reduction gear 43 and generates a steering assist force, and a motor drive control device 45 fixed and supported on the housing of the electric motor 44.

The electric motor 44 is implemented as a three-phase brushless motor and includes an annular motor rotor and an annular motor stator (neither is illustrated). The motor stator includes a plurality of circumferentially equidistant pole teeth projecting radially inwards, and a magnetic exciting coil is wound around each pole tooth. The motor rotor is coaxially placed inside the motor stator. The motor rotor includes a plurality of circumferentially equidistant magnets arranged on its outer peripheral surface and opposed to the pole teeth of the motor stator with slight air gaps between them.

The motor rotor is fixed to a motor rotating shaft and rotates upon magnetic excitation of the teeth of the motor stator in a predetermined sequence by supplying a three-phase AC current to the coil of the motor stator via the motor drive control device 45, and the motor rotating shaft rotates with this rotation.

When the motor rotating shaft rotates, its rotational force (steering assist force) is transmitted to the steering shaft 32 via the reduction gear 43 to rotate the steering shaft 32. When the steering wheel 31 is steered to rotate the steering shaft 32, its rotational force is transmitted to the motor rotating shaft via the reduction gear 43 to rotate the motor rotor. In other words, since the rotation positions of the electric motor 44 and the steering shaft 32 have a correspondence, the rotation position of one of them can be calculated from the rotation information of the other.

The motor drive control device 45 is actuated upon being supplied with power from a battery 61 serving as a vehicle-mounted power supply. The battery 61 has its anode connected to ground and its cathode connected to the motor drive control device 45 via an ignition switch 62 (to be also referred to as the "IG switch 62" hereinafter) which starts an engine and directly connected to the motor drive control device 45 without the IG switch 62.

The motor drive control device 45 receives the steering torque T detected by the torque sensor 41, and a vehicle speed V detected by a vehicle speed sensor 60, as illustrated in FIG. 1.

(Configuration of Motor Drive Control Device 45)

Figure 2:
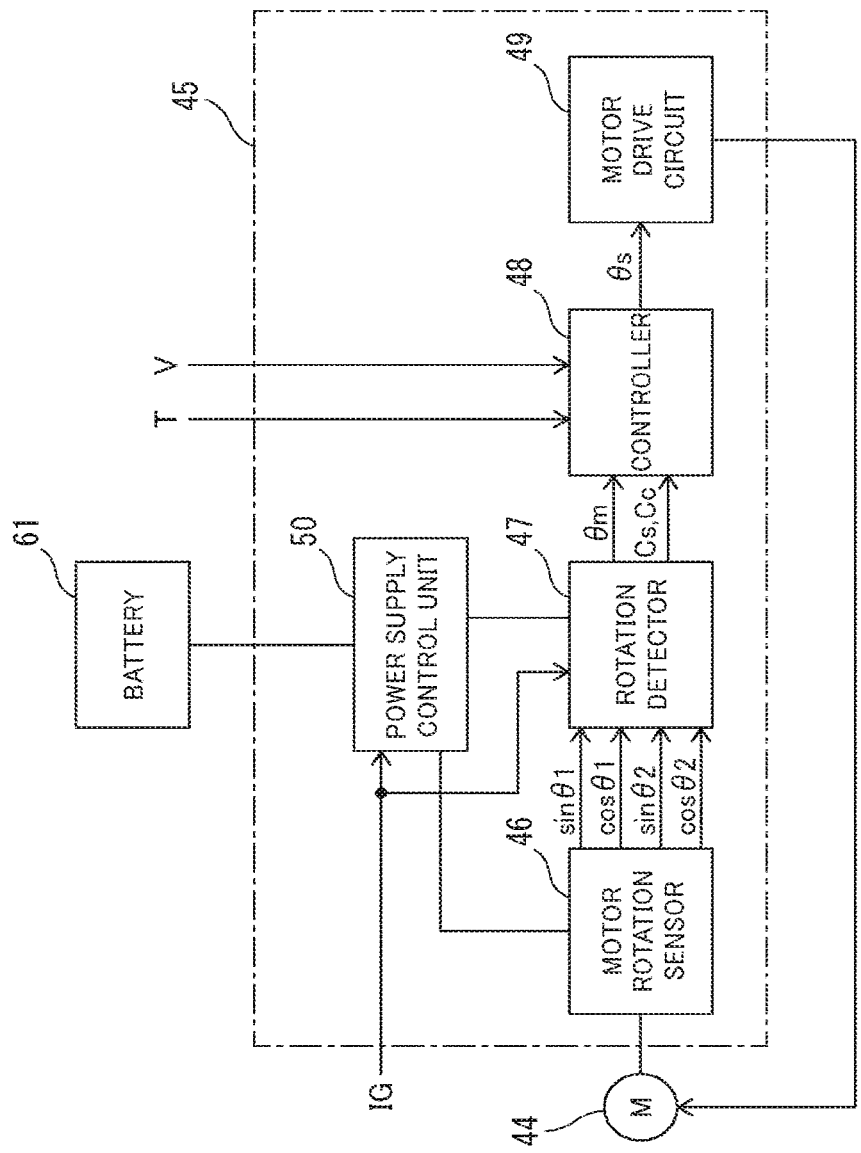
FIG. 2 is a block diagram illustrating the entire configuration of the motor drive control device according to the first embodiment.

The motor drive control device 45 includes a motor rotation sensor 46, a rotation detector 47, a controller 48, a motor drive circuit 49, and a power supply control unit 50, as illustrated in FIG. 2.

The motor rotation sensor 46 is implemented as a magnetic sensor for detecting rotation position information of the electric motor 44 and includes a first rotation position information detection unit 46b and a second rotation position information detection unit 46c as two systems of rotation position information detection units, as illustrated in FIGS. 3A to 3D. The detailed arrangement of the motor rotation sensor 46 will be described later.

Referring back to FIG. 2, the rotation detector 47 receives a first motor rotation position signal (sin θ1, cos θ1) and a second motor rotation position signal (sin θ2, cos θ2) as magnetic detection signals detected by the first and second rotation position information detection units 46b and 46c.

The first motor rotation position signal (sin θ1, cos θ1) and the second motor rotation position signal (sin θ2, cos θ2) will also be abbreviated individually as "sin θ1", "cos θ1", "sin θ2" and "cos θ2" hereinafter.

Figure 4:
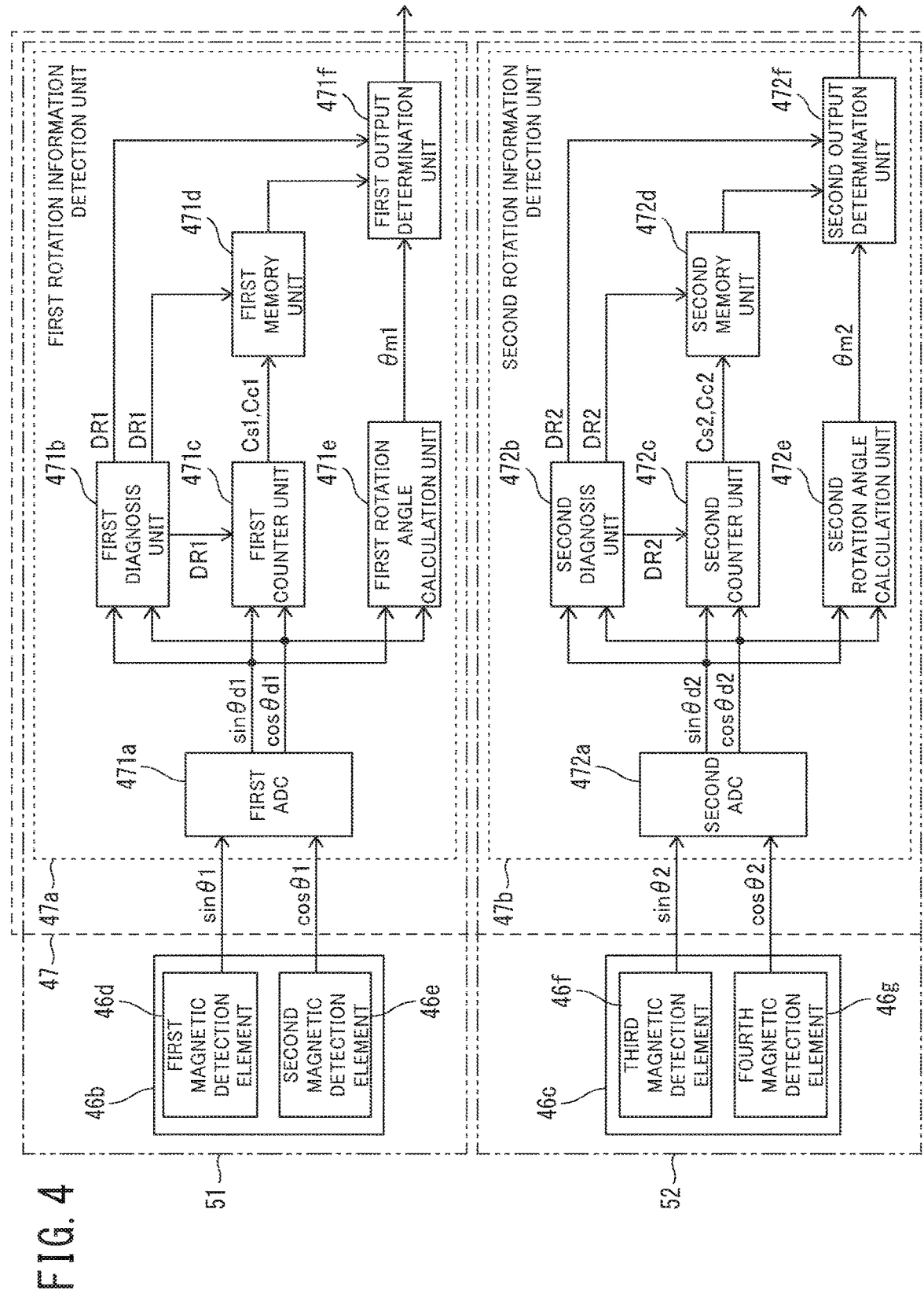
FIG. 4 is a block diagram illustrating a specific configuration example of rotation information detection function units according to the first embodiment.

The rotation detector 47 includes two systems of a first and a second rotation information detection units 47a and 47b which perform processing for diagnosing abnormalities of the input first motor rotation position signal (sin θ1, cos θ1) and second motor rotation position signal (sin θ2, cos θ2), that for calculating a motor rotation angle θm, that for measuring an amount of change in motor rotation position, and the like, based on these motor rotation position signals, as illustrated in FIG. 4. The detailed configuration of the rotation detector 47 will be described later.

The rotation detector 47 according to the first embodiment is configured to continue processing for measuring an amount of change in motor rotation position even while the IG switch 62 is OFF, although details will be described later.

Referring back to FIG. 2, the controller 48 controls the motor drive circuit 49 based on the steering torque T, the vehicle speed V, and the motor rotation angle θm and the amount of change in motor rotation position (count values Cs and Cc; to be described later) from the rotation detector 47 to control driving of the electric motor 44.

More specifically, in steering assist control, the controller 48 calculates a steering assist command value (steering assist torque command value) for generating a steering assist torque according to the steering torque T, the vehicle speed V, and the motor rotation angle θm in the electric motor 44, using a known procedure, and, in turn, calculates a first current command value Iref1 for steering assist control based on the calculated steering assist command value. The controller 48 controls the motor drive circuit 49 based on the calculated first current command value Iref1 to control driving of the electric motor 44.

In this case, the controller 48 according to the first embodiment determines whether or not an abnormality has occurred in the first motor rotation position signal (sin θ1, cos θ1) and the second motor rotation position signal (sin θ2, cos θ2), based on the respective abnormality diagnosis results obtained by the two systems of a first and a second rotation information detection units 47a and 47b of the rotation detector 47. When the controller 48 determines that an abnormality has occurred in one of these signals, it performs steering assist control based on a motor rotation angle having no abnormality of a first motor rotation angle θm1 calculated based on the first motor rotation position signal (sin θ1, cos θ1) and a second motor rotation angle θm2 calculated based on the second motor rotation position signal (sin θ2, cos θ2).

The controller 48 calculates (estimates) the rotation position θs (to be also referred to as the "steering angle θs" hereinafter) of the steering shaft 31 based on the motor rotation angle θm from the rotation detector 47 while the IG switch 62 is ON.

However, when the IG switch 62 changes from OFF to ON, the controller 48 according to the first embodiment calculates a steering angle θs upon a change from OFF to ON, based on the steering angle θs and the amount of change in motor rotation position (count values Cs and Cc; to be described later) immediately before switch-off stored in a nonvolatile memory (not illustrated) in advance, and the amount of change in motor rotation position immediately after switch-on.

In performing autonomous cruise control in accordance with a command from an autonomous cruise controller (not illustrated), the controller 48 calculates a second current command value Iref2 for autonomous cruise control based on a target steering angle θs* from the autonomous cruise controller, the calculated steering angle θs, and the motor rotation angle θm from the rotation detector 47. The controller 48 controls the motor drive circuit 49 based on the calculated second current command value Iref2 to control driving of the electric motor 44.

The motor drive circuit 49 includes a three-phase inverter circuit (not illustrated) and drives the three-phase inverter circuit based on a drive signal (for example, a PWM signal) from the controller 48 to supply a motor drive current to the electric motor 44.

The power supply control unit 50 is connected to the battery 61 directly and to the IG switch 62 and receives a signal (to be also referred to as an "IG signal" or "IG" hereinafter) indicating ON and OFF of the IG switch 62 from the IG switch 62. When the power supply control unit 50 determines that the IG switch 62 is ON based on the input IG signal, it continuously supplies power from the battery 61 to the first and second rotation position information detection units 46b and 46c and the rotation detector 47 in ON state.

The power supply state in which power is continuously supplied from the battery 61 will also be referred to as the "normally supplied state" hereinafter.

When the power supply control unit 50 determines that the IG switch 62 is OFF, it intermittently supplies power from the battery 61 to the first and second rotation position information detection units 46b and 46c and the rotation detector 47 at a preset certain interval in OFF state. In other words, the power supply control unit 50 is configured to reduce the power consumption while the IG switch is OFF by intermittent supply.

The power supply state in which power is intermittently supplied from the battery 61 will also be referred to as the "intermittently supplied state" hereinafter.

The certain interval value in intermittent supply is determined from the capacity (dark current) of the battery 61 and the maximum rotational speed of the steering wheel 31. In other words, since a change in motor rotation position may fail to be followed when the interval at which no power is supplied is set too long, the interval is determined to allow sufficient following.

(Arrangement of Motor Rotation Sensor 46)

The specific arrangement of the motor rotation sensor 46 will be described below with reference to FIGS. 3A to 3D.

Figure 3A:
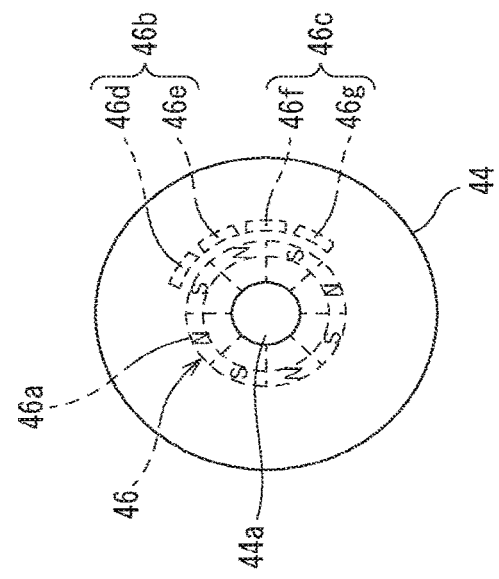
FIGS. 3A and 3B are views illustrating an arrangement example of a motor rotation sensor according to the first embodiment.

The motor rotation sensor 46 according to the first embodiment is placed at the stator end position, on the side of the reduction gear 43, of a motor rotating shaft 44a located in a motor stator for the electric motor 44, as illustrated in FIG. 3A.

Figure 3B:
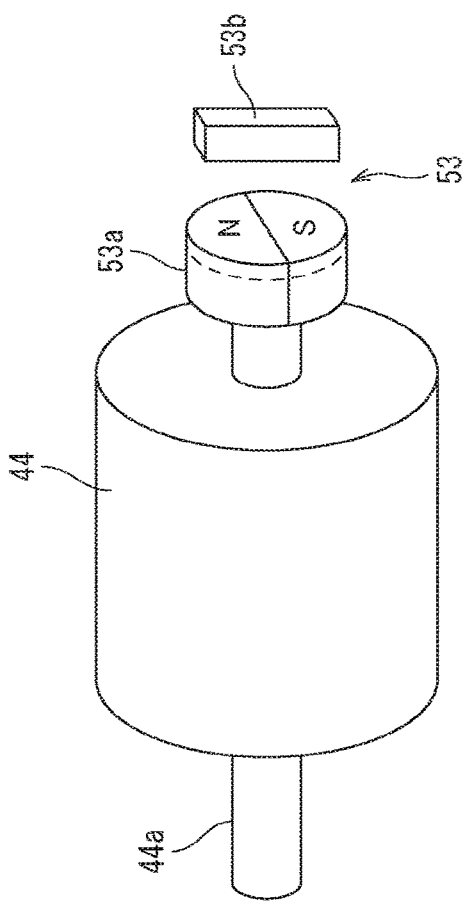

More specifically, the motor rotation sensor 46 includes a multipolar ring magnet 46a, a first rotation position information detection unit 46b, and a second rotation position information detection unit 46c, as illustrated in FIG. 3B.

The multipolar ring magnet 46a is implemented as an annular (ring-shaped) multipolar magnet magnetized with its south and north poles circumferentially alternately arranged on the outer surface in sequence and is fixed and supported on the motor rotating shaft 44a. The multipolar ring magnet 46a is fixed and supported to be rotatable in synchronism with the motor rotating shaft 44a inside the motor stator concentrically with the motor rotating shaft 44a as the motor rotating shaft 44a is inserted into its central through hole. This rotates the multipolar ring magnet 46a in synchronism with rotation of the motor rotating shaft 44a.

The multipolar ring magnet 46a is magnetized by sinusoidal magnetization and has a sinusoidal magnetic flux density distribution on each magnetic pole surface.

The first rotation position information detection unit 46b includes a first magnetic detection element 46d and a second magnetic detection element 46e. The first magnetic detection element 46d and the second magnetic detection element 46e are opposed to the outer peripheral surface of the multipolar ring magnet 46a with a given spacing between them and juxtaposed to each other to be out of phase with each other by an electrical angle of 90° in the circumferential direction of the multipolar ring magnet 46a.

The second rotation position information detection unit 46c includes a third magnetic detection element 46f and a fourth magnetic detection element 46g. The third magnetic detection element 46f and the fourth magnetic detection element 46g are opposed to the outer peripheral surface of the multipolar ring magnet 46a with a given spacing between them and juxtaposed to each other to be out of phase with each other by an electrical angle of 90° in the circumferential direction of the multipolar ring magnet 46a.

With such an arrangement, the first rotation position information detection unit 46b can detect a magnetic flux of the multipolar ring magnet 46a which changes depending on the rotation position of the motor rotating shaft 44a as a sine and cosine wave magnetic detection signal (first motor rotation position signal (sin θ1, cos θ1)). The second rotation position information detection unit 46c can detect a magnetic flux of the multipolar ring magnet 46a which changes depending on the rotation position of the motor rotating shaft 44a as a sine and cosine wave magnetic detection signal (second motor rotation position signal (sin θ2, cos θ2)). The first motor rotation position signal (sin θ1, cos θ1) and the second motor rotation position signal (sin θ2, cos θ2) match each other when the first rotation position information detection unit 46b and the second rotation position information detection unit 46c are normal.

In other words, the motor rotation sensor 46 according to the first embodiment includes two systems of rotation position information detection units.

The motor rotation sensor 46 illustrated in FIGS. 3A and 3B is designed by opposing the first rotation position information detection unit 46b and the second rotation position information detection unit 46c to the outer peripheral surface of the multipolar ring magnet 46a with a given spacing between them, but the present invention is not limited to this arrangement.

Figure 3C:
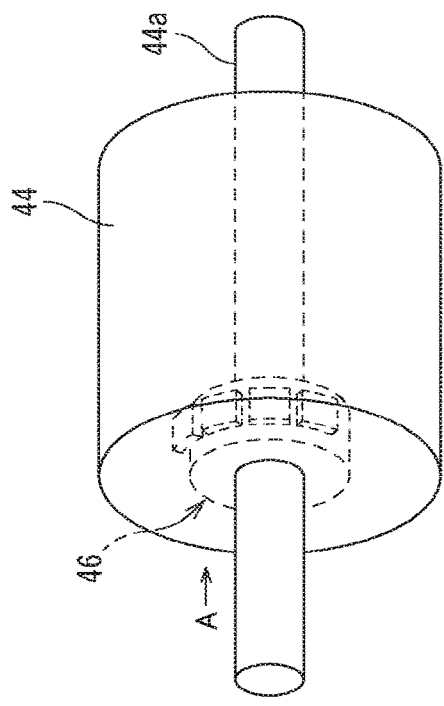
FIGS. 3C and 3D are views illustrating another arrangement example.

As illustrated as, for example, a motor rotation sensor 46' in FIG. 3C, the first rotation position information detection unit 46b and the second rotation position information detection unit 46c may be opposed to the axial end surface of the multipolar ring magnet 46a with a given spacing between them.

Figure 3D:
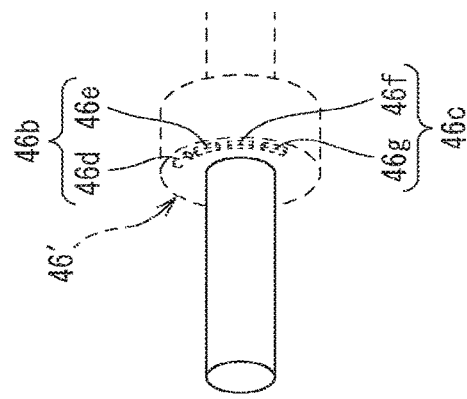

The motor rotation sensor is not limited to the arrangements illustrated in FIGS. 3A to 3C, and a motor rotation sensor 53 illustrated in FIG. 3D, for example, may be used.

The motor rotation sensor 53 includes a bipolar magnet 53a and a third rotation position information detection unit 53b.

The bipolar magnet 53a is implemented as a disk-shaped magnet with one axial end surface magnetized to two poles: the south and north poles and is fixed and supported on the motor rotating shaft 44a as the end of the motor rotating shaft 44a opposite to the reduction gear 43 is inserted concentrically with the bipolar magnet 53a into a recess formed at the center of the surface opposite to the magnetized surface. This rotates the bipolar magnet 53a in synchronism with rotation of the motor rotating shaft 44a.

The third rotation position information detection unit 53b is opposed to the other axial end surface of the bipolar magnet 53a with a given spacing between them. The third rotation position information detection unit 53b includes two systems of rotation position information detection units (not illustrated), like the motor rotation sensor 46, and can detect a first motor rotation position signal (sin θ1, cos θ1) and a second motor rotation position signal (sin θ2, cos θ2), like the motor rotation sensor 46 again.

(Configuration of Rotation Detector 47)

The specific configuration of the rotation detector 47 will be described below with reference to FIG. 4.

The rotation detector 47 includes a first rotation information detection unit 47a and a second rotation information detection unit 47b, as illustrated in FIG. 4.

The first rotation position information detection unit 46b and the first rotation information detection unit 47a form a first rotation information detection function unit 51, and the second rotation position information detection unit 46c and the second rotation information detection unit 47b form a second rotation information detection function unit 52. In other words, the motor drive control device 45 according to the first embodiment includes two systems of rotation information detection function units.

The first rotation information detection unit 47a includes a first ADC (Analog-to-Digital Converter) 471a, a first diagnosis unit 471b, a first counter unit 471c, a first memory unit 471*d*, a first rotation angle calculation unit 471*e*, and a first output determination unit 471*f*.

When the first ADC 471*a* receives an analog, first motor rotation position signal (sin θ1, cos θ1) from the first rotation position information detection unit 46*b*, it converts the signal into a first digital rotation position signal (sin θd1, cos θd1) as a digital, first motor rotation position signal. The first ADC 471*a* outputs the first digital rotation position signal (sin θd1, cos θd1) to each of the first diagnosis unit 471*b*, the first counter unit 471*c*, and the first rotation angle calculation unit 471*e*.

The first digital rotation position signal (sin θd1, cos θd1) will also be abbreviated simply as a "first digital rotation position signal" or individually as "sin θd1" and "cos θd1" hereinafter.

The first diagnosis unit 471*b* diagnoses an abnormality of the first digital rotation position signal, based on this first digital rotation position signal. The first diagnosis unit 471*b* sets a first diagnosis result flag DR1 indicating the diagnosis result and outputs the first diagnosis result flag DR1 to each of the first counter unit 471*c*, the first memory unit 471*d*, and the first output determination unit 471*f*.

More specifically, the first diagnosis unit 471*b* diagnoses an abnormality of the first digital rotation position signal based on the following equation (1):

$$\sin \theta d^2 + \cos \theta d^2 = 1 \qquad (1)$$

In other words, calculating the squares of sin and cos signals yields waveforms that are identical, but opposite in phase, and equation (1) holds. Accordingly, as long as sin θd1 and cos θd1 are normal, the sum of their squares "sin θd1$^2$+cos θd1$^2$" is 1.

As long as the sum of the squares of sin θd1 and cos θd1 is 1, the first digital rotation position signal can be diagnosed as having no abnormality (as normal). The signal can be diagnosed as abnormal when a numerical value other than "1" is set.

The first diagnosis unit 471*b* sets the first diagnosis result flag DR1 to "0" when the signal is diagnosed as normal and to "1" when the signal is diagnosed as abnormal.

The first counter unit 471*c* counts the values of sin θd1 and cos θd1 for each of their quadrants and outputs a first sin count value Cs1 and a first cos count value Cc1 to the first memory unit 471*d* as the count values.

The first sin count value Cs1 and the first cos count value Cc1 will also be abbreviated as the "first count values Cs1 and Cc1" hereinafter.

The first counter unit 471*c* is configured to stop the operation when the first diagnosis result flag DR1 input from the first diagnosis unit 471*b* is "1".

Since the first counter unit 471*c* has a design count set per cycle, rotation count information can also be evaluated based on the first count values Cs1 and Cc1.

The first memory unit 471*d* includes a nonvolatile memory (not illustrated) and stores the first count values Cs1 and Cc1 input from the first counter unit 471*c* in the nonvolatile memory.

The first memory unit 471*d* is configured to stop the operation when the first diagnosis result flag DR1 input from the first diagnosis unit 471*b* is "1."

The first rotation angle calculation unit 471*e* calculates a first motor rotation angle θm1 based on the first digital rotation position signal from the first ADC 471*a*. The first rotation angle calculation unit 471*e* outputs the calculated first motor rotation angle θm1 to the first output determination unit 471*f*.

The first output determination unit 471*f* outputs the first diagnosis result flag DR1 input from the first diagnosis unit 471*b* and the first motor rotation angle θm1 input from the first rotation angle calculation unit 471*e* to the controller 48 when the first diagnosis result flag DR1 is "0." When the IG switch 62 changes from OFF to ON, the first output determination unit 471*f* further outputs the first count values Cs1 and Cc1 stored in the first memory unit 471*d* to the controller 48.

The first output determination unit 471*f* stops outputting the first motor rotation angle θm1 and the first count values Cs1 and Cc1 and outputs only the first diagnosis result flag DR1 to the controller 48, when the first diagnosis result flag DR1 is "1."

The second rotation information detection unit 47*b* includes a second ADC 472*a*, a second diagnosis unit 472*b*, a second counter unit 472*c*, a second memory unit 472*d*, a second rotation angle calculation unit 472*e*, and a second output determination unit 472*f*.

When the second ADC 472*a* receives an analog, second motor rotation position signal (sin θ2, cos θ2) from the second rotation position information detection unit 46*c*, it converts the signal into a second digital rotation position signal (sin θd2, cos θd2) as a digital, second motor rotation position signal. The second ADC 472*a* outputs the second digital rotation position signal (sin θd2, cos θd2) to each of the second diagnosis unit 472*b*, the second counter unit 472*c*, and the second rotation angle calculation unit 472*e*.

The second digital rotation position signal (sin θd2, cos θd2) will also be abbreviated simply as a "second digital rotation position signal" or individually as "sin θd2" and "cos θd2" hereinafter.

The second diagnosis unit 472*b*, the second counter unit 472*c*, the second memory unit 472*d*, the second rotation angle calculation unit 472*e*, and the second output determination unit 472*f* perform the same operations as those of the first diagnosis unit 471*b*, the first counter unit 471*c*, the first memory unit 471*d*, the first rotation angle calculation unit 471*e*, and the first output determination unit 471*f*, respectively, except that different signals are used. Hence, these units will not be described herein.

A flag indicating the diagnosis result obtained by the second diagnosis unit 472*b* is defined as a second diagnosis result flag DR2, the count values obtained by the second counter unit 472*c* are defined as a second sin count value Cs2 and a second cos count value Cc2, and the motor rotation angle calculated by the second rotation angle calculation unit 472*e* is defined as a second motor rotation angle θm2.

The second sin count value Cs2 and the second cos count value Cc2 will also be abbreviated as the "second count values Cs2 and Cc2" hereinafter.

With the above-mentioned configuration of the first and second rotation information detection function units 51 and 52, the controller 48 can recognize that an abnormality has occurred in the first rotation information detection function unit 51 when the first diagnosis result flag DR1 is "1," and recognize that an abnormality has occurred in the second rotation information detection function unit 52 when the second diagnosis result flag DR2 is "1." In other words, one of the first and second rotation information detection function units 51 and 52, having an abnormality, can be identified.

The controller 48 according to the first embodiment is configured to, upon detection of an abnormality, notify the driver of the abnormality by turning on a warning lamp (not illustrated) and displaying a warning message on a display of a car navigation system (not illustrated).

The first rotation information detection unit 47a and the second rotation information detection unit 47b according to the first embodiment are independent of each other. These units are formed independently of each other by a circuit such as an ASIC (Application Specific Integrated Circuit) that is an integrated circuit designed and manufactured for any specific application, or an FPGA (Field Programmable Gate Array) that is an integrated circuit whose configuration can be set by a purchaser or a designer after manufacture. Therefore, even when an abnormality occurs in one of these units, the other unit can be independently operated free from the influence of the abnormality.

The first and second rotation information detection function units 51 and 52 according to the first embodiment are intermittently supplied with power from the battery 61 via the power supply control unit 50 even when the IG switch 62 is turned off. The first and second rotation information detection function units 51 and 52 can, therefore, continue processing for detecting a first and a second motor rotation position signals, that for A/D-converting the first and second motor rotation position signals, that for counting a first and a second digital rotation position signals, and that for storing the count values, even while the IG switch 62 is OFF.

With this operation, even when the steering wheel 31 is steered while the IG switch 62 is OFF, a change in motor rotation position can be followed, and the controller 48 can calculate an accurate steering angle θs based on the first count values Cs1 and Cc1 and the second count values Cs2 and Cc2 input from the first rotation information detection function unit 51 and the second rotation information detection function unit 52 when the IG switch 62 changes from OFF to ON.

(Operation)

An operation according to the first embodiment will be described below with reference to FIG. 5.

Assume now that the IG switch 62 is ON, and power is supplied from the battery 61 to the first and second rotation information detection function units 51 and 52 via the power supply control unit 50 in the normally supplied state.

In this state, the first and second rotation position information detection units 46b and 46c detect the first and second motor rotation position signals according to the motor rotation position, and input the detected first and second motor rotation position signals to the first and second rotation information detection units 47a and 47b.

With this operation, the first and second rotation information detection units 47a and 47b use the first and second ADCs 471a and 472a to convert the input an analog, first and second motor rotation position signals into the digital, first and second digital rotation position signals. The first and second rotation information detection units 47a and 47b output the first and second digital rotation position signals after conversion to each of the first and second diagnosis units 471b and 472b, the first and second counter units 471c and 472c, and the first and second rotation angle calculation units 471e and 472e.

The first and second diagnosis units 471b and 472b calculate "sin θd1²+cos θd1²" and "sin θd2²+cos θd2²" in accordance with equation (1) from the input first and second digital rotation position signals and determine whether or not their calculation results are "1".

Assuming herein that the calculation results are both "1", the first and second diagnosis units 471b and 472b output "0" as the first and second diagnosis result flags DR1 and DR2 to each of the first and second counter units 471c and 472c, the first and second memory units 471d and 472d, and the first and second output determination units 471f and 472f.

The first and second counter units 471c and 472c count the input first and second digital rotation position signals for each quadrant and output, as their count values, the first count values Cs1 and Cc1 to the first memory unit 471d and the second count values Cs2 and Cc2 to the second memory unit 472d.

The first memory unit 471d stores the input first count values Cs1 and Cc1 in its own nonvolatile memory, and the second memory unit 472d stores the input second count values Cs2 and Cc2 in its own nonvolatile memory.

The first and second rotation angle calculation units 471e and 472e calculate a first and a second motor rotation angles θm1 and θm2 from the input first and second digital rotation position signals and output the first motor rotation angle θm1 to the first output determination unit 471f and the second motor rotation angle θm2 to the second output determination unit 472f.

The first and second output determination units 471f and 472f output the input first and second diagnosis result flags DR1 and DR2 and the input first and second motor rotation angles θm1 and θm2 to the controller 48, because these first and second diagnosis result flags DR1 and DR2 are "0".

The controller 48 determines that no abnormality has occurred in both the first and second rotation information detection function units 51 and 52 (both of these units are normal), based on the first and second diagnosis result flags DR1 and DR2 input from the first and second rotation information detection function units 51 and 52.

The controller 48 calculates a steering angle θs based on the first motor rotation angle θm1 in this case, of the input first and second motor rotation angles θm1 and θm2. The controller 48 controls driving of the electric motor 44 based on the first motor rotation angle θm1 in steering assist control and controls driving of the electric motor 44 based on the calculated steering angle θs and the first motor rotation angle θm1 in autonomous cruise control.

When the IG switch 62 is turned off, the power supply control unit 50 switches the state of power supply from the battery 61 to the first and second rotation information detection function units 51 and 52 from the normally supplied state to the intermittently supplied state.

Figure 5:
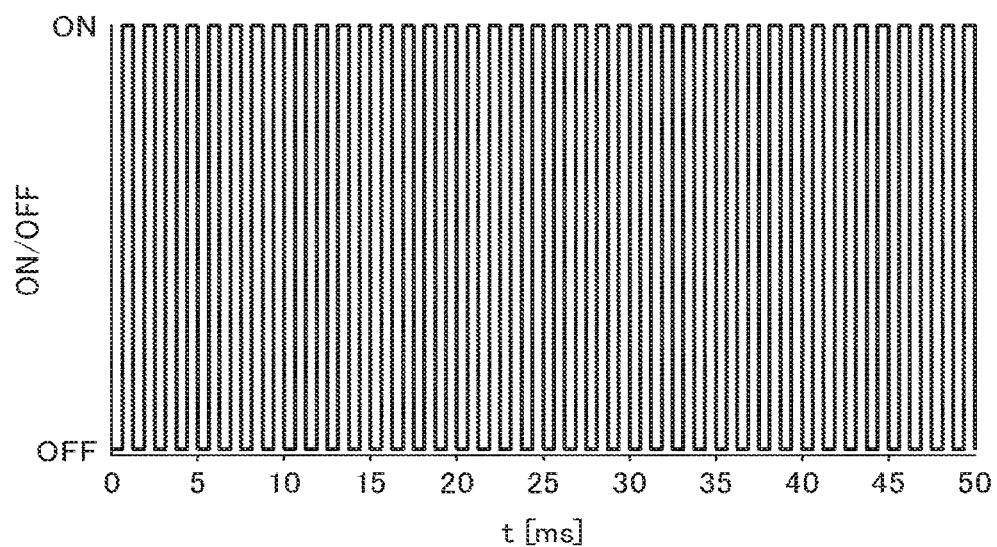
FIG. 5 is a waveform chart illustrating exemplary intermittent supply control of a power supply control unit according to the first embodiment.

More specifically, a switch (not illustrated) for switching between ON and OFF of power supplied from the battery 61 to the first and second rotation information detection function units 51 and 52 is alternately turned on and off at certain intervals respectively set in advance for ON and OFF states (1 [ms] in the example of FIG. 5), as illustrated in FIG. 5. Note that power is supplied when the switch is ON, and no power is supplied when the switch is OFF.

Even in the intermittently supplied state, the analog, first and second motor rotation position signals are input to the first and second ADCs 471a and 472a and converted into the digital, first and second digital rotation position signals. The first and second diagnosis units 471b and 472b diagnose the first and second digital rotation position signals. The first and second rotation angle calculation units 471e and 472e perform processing for calculating the first and second motor rotation angles θm1 and θm2.

Assume herein that the first and second digital rotation position signals have no abnormalities, and the first and second diagnosis result flags DR1 and DR2 become "0".

Then, even in the intermittently supplied state, the first and second counter units 471c and 472c continue their counting processing, and the first and second memory units 471d and 472d continue processing for storing the count values.

In this case, assume, for example, that the driver riding in a vehicle 1 equipped with the so-called idling stop function of automatically stopping an engine at the time of stoppage steers the steering wheel 31 to rotate the motor rotating shaft 44a after the IG switch 62 is turned off by this idling stop function, while waiting for the lights to change.

In this manner, even when steering is performed while the IG switch 62 is OFF, the first and second counter units 471c and 472c can count values according to changes of the first and second digital rotation position signals, and the first memory unit 471d and the second memory unit 472d can store the first count values Cs1 and Cc1 and the second count values Cs2 and Cc2.

When the IG switch 62 changes from OFF to ON, the first and second output determination units 471f and 472f output not only the first and second diagnosis result flags DR1 and DR2 and the first and second motor rotation angles θm1 and θm2, but also the first count values Cs1 and Cc1 and the second count values Cs2 and Cc2 stored in the first and second memory units 471d and 472d to the controller 48.

The controller 48 calculates a steering angle θs based on the input first count values Cs1 and Cc1 and second count values Cs2 and Cc2 and controls driving of the electric motor 44 based on the calculated steering angle θs and the input first and second motor rotation angles θm1 and θm2 in autonomous cruise control.

Assume that the same processing as in the above-mentioned normal supply is performed in the normally supplied state, and the first diagnosis result flag DR1 becomes "1" and the second diagnosis result flag DR2 becomes "0" in the first and second diagnosis units 471b and 472b. In other words, assume that "1" as the first diagnosis result flag DR1 indicating an abnormality is input to the first counter unit 471c, the first memory unit 471d, and the first output determination unit 471f.

Then, the first counter unit 471c and the first memory unit 471d stop their operations.

The first output determination unit 471f stops outputting the first motor rotation angle θm1 and the first count values Cs1 and Cc1 and outputs only the first diagnosis result flag DR1 (=1) to the controller 48.

The second rotation information detection function unit 52 normally operates to output the second diagnosis result flag DR2 (=0) and the second motor rotation angle θm2 to the controller 48.

The controller 48 determines that an abnormality has occurred in the first rotation information detection function unit 51 from the input first diagnosis result flag DR1 (=1) and determines that the second rotation information detection function unit 52 is normal from the input second diagnosis result flag DR2 (=0). The controller 48 controls driving of the electric motor 44 using the second motor rotation angle θm2 input from the second rotation information detection function unit 52 determined to be normal.

The multipolar ring magnet 46a corresponds to an annular magnet, the first and second rotation position information detection units 46b and 46c correspond to a rotation position information detection unit, and the first and second rotation angle calculation units 471e and 472e correspond to a motor rotation angle calculation unit.

The first and second diagnosis units 471b and 472b correspond to a rotation position information diagnosis unit, the controller 48 and the motor drive circuit 49 correspond to a motor drive control unit, and the first and second rotation information detection function units 51 and 52 correspond to at least two systems of rotation information detection function units.

The first and second counter units 471c and 472c and the first and second memory units 471d and 472d correspond to a rotation change amount measurement unit.

Effects of First Embodiment (1) The motor drive control device 45 according to the first embodiment includes an annular multipolar ring magnet 46a that is placed on the motor rotating shaft 44a of the electric motor 44 to be rotatable in synchronism with the motor rotating shaft 44a and has at least two different magnetic poles circumferentially alternately arranged.

The motor drive control device 45 further includes two systems of rotation information detection function units: a first rotation information detection function unit 51 and a second rotation information detection function unit 52. The first rotation information detection function unit 51 includes a first rotation position information detection unit 46b which detects a magnetic flux of the multipolar ring magnet 46a which changes depending on the rotation position of the motor rotating shaft 44a, that is, magnetic detection signals out of phase with each other by an electrical angle of 90° as rotation position information (first motor rotation position signal (sin θ1, cos θ1)) using the first magnetic detection element 46d and the second magnetic detection element 46e, a first rotation angle calculation unit 471e which calculates a first motor rotation angle θm1 based on the rotation position information detected by the first rotation position information detection unit 46b, and a first diagnosis unit 471b which diagnoses an abnormality of the rotation position information detected by the first rotation position information detection unit 46b. The second rotation information detection function unit 52 includes a second rotation position information detection unit 46c which detects a magnetic flux of the multipolar ring magnet 46a which changes depending on the rotation position of the motor rotating shaft 44a, that is, magnetic detection signals out of phase with each other by an electrical angle of 90° as rotation position information (second motor rotation position signal (sin θ2, cos θ2)) using the third magnetic detection element 46f and the fourth magnetic detection element 46g, a second rotation angle calculation unit 472e which calculates a second motor rotation angle θm2 based on the rotation position information detected by the second rotation position information detection unit 46c, and a second diagnosis unit 472b which diagnoses an abnormality of the rotation position information detected by the second rotation position information detection unit 46c.

The motor drive control device 45 further includes a controller 48 and a motor drive circuit 49 which control driving of the electric motor 44 based on the first and second motor rotation angles θm1 and θm2 output from the two systems of the first and second rotation information detection function units 51 and 52.

When one of the first and second rotation information detection function units 51 and 52 diagnoses an abnormality of the motor rotation position signal thereof, the controller 48 and the motor drive circuit 49 control driving of the electric motor 44 based on the motor rotation angle output from the other, normal rotation information detection function unit.

With this configuration, since the first and second rotation information detection function units 51 and 52, each of which can diagnose an abnormality of rotation position information thereof, are used, the rotation information detection function unit having an abnormality can be identified, and when one rotation information detection function unit diagnoses an abnormality, drive control of the electric motor 44 can be continued by using the other, normal rotation information detection function unit. In addition, since each system is configured to detect two pieces of rotation position information (sin θ, cos θ) 90° out of phase with each other using two magnetic detection elements, a system having an abnormality can be more accurately identified from these two pieces of rotation position information.

(2) In the motor drive control device 45 according to the first embodiment, the electric motor 44 serves as a motor which applies a steering assist force to the steering shaft 32 of the vehicle 1 equipped with the motor drive control device 45, and the first and second rotation information detection function units 51 and 52 include the first and second counter units 471c and 472c and the first and second memory units 471d and 472d which measure an amount of change in rotation position of the electric motor 44.

The motor drive control device 45 is further configured to supply power from the battery 61 of the vehicle 1 to the first and second rotation information detection function units 51 and 52 even while the IG switch 62 is OFF, and the first and second counter units 471c and 472c and the first and second memory units 471d and 472d continuously measure and store an amount of change in rotation position even while the IG switch 62 is OFF.

The controller 48 and the motor drive circuit 49 calculate a steering angle θs that is the rotation angle of the steering shaft 32 based on the amount of change in motor rotation position measured by the first and second counter units 471c and 472c and the first and second memory units 471d and 472d when the IG switch 62 changes from OFF to ON, and further calculate a steering angle θs based on the first and second motor rotation angles θm1 and θm2 while the IG switch 62 is subsequently kept ON, to control driving of the electric motor 44 based on the calculated steering angle θs.

With this configuration, even when the driver of the vehicle 1 steers the steering wheel 31 while the IG switch 62 is OFF, an amount of change in motor rotation position can be continuously measured. This can yield an accurate steering angle θs from the measured amount of change, immediately after the IG switch 62 changes from OFF to ON. As a result, a measure can be immediately taken upon control including steering angle control such as autonomous cruise control directly after ON state is set.

(3) The motor drive control device 45 according to the first embodiment includes a power supply control unit 50 which intermittently supplies power from the battery 61 of the vehicle 1 to the first and second rotation information detection function units 51 and 52 while the IG switch 62 is OFF.

With this configuration, the first and second rotation information detection function units 51 and 52 can be continuously operated even while the IG switch 62 is OFF, and the power consumption in OFF state can be cut.

(4) The electric power steering device 3 according to the first embodiment includes the motor drive control device 45. The vehicle 1 according to the first embodiment includes the electric power steering device 3.

Both arrangements thus allow highly reliable steering assist control.

Modification 1 of First Embodiment

Modification 1 of the first embodiment will be described below with reference to FIG. 6.

Modification 1 is different from the first embodiment in that in the first embodiment the power supply control unit 50 intermittently supplies power from the battery 61 at a certain interval to all constituent units of the first and second rotation information detection function units 51 and 52 while the IG switch 62 is OFF, but in Modification 1 the interval at which power is supplied is changed.

The same reference numerals as in the first embodiment denote the same constituent units, and a description thereof will be omitted as appropriate, while only different parts will be described in detail hereinafter.

The power supply control unit 50 according to Modification 1 switches the state of power supply to the motor rotation sensor 46 and the rotation detector 47 from the intermittently supplied state to the normally supplied state when it determines that the motor rotational speed (rpm) becomes equal to or higher than a rotational speed ωt set in advance, while the IG switch 62 is OFF and in the intermittently supplied state. The power supply control unit 50 is further configured to make switching from the normally supplied state to the intermittently supplied state when it determines that the motor rotational speed becomes lower than the set rotational speed ωt, in the normally supplied state after switching. In other words, while the IG switch 62 is OFF, when the driver steers the steering wheel 31 and the motor rotational speed becomes equal to or higher than the set rotational speed ωt, power from the battery 61 is set in the normally supplied state so that a change in motor rotation position can be more reliably followed.

(Operation)

An operation according to Modification 1 of the first embodiment will be described below with reference to FIG. 6.

Assume now that the IG switch 62 of the vehicle 1 changes from ON to OFF. Then, the power supply control unit 50 switches the state of power supply from the battery 61 to the first and second rotation information detection function units 51 and 52 from the normally supplied state to the intermittently supplied state.

Figure 6:
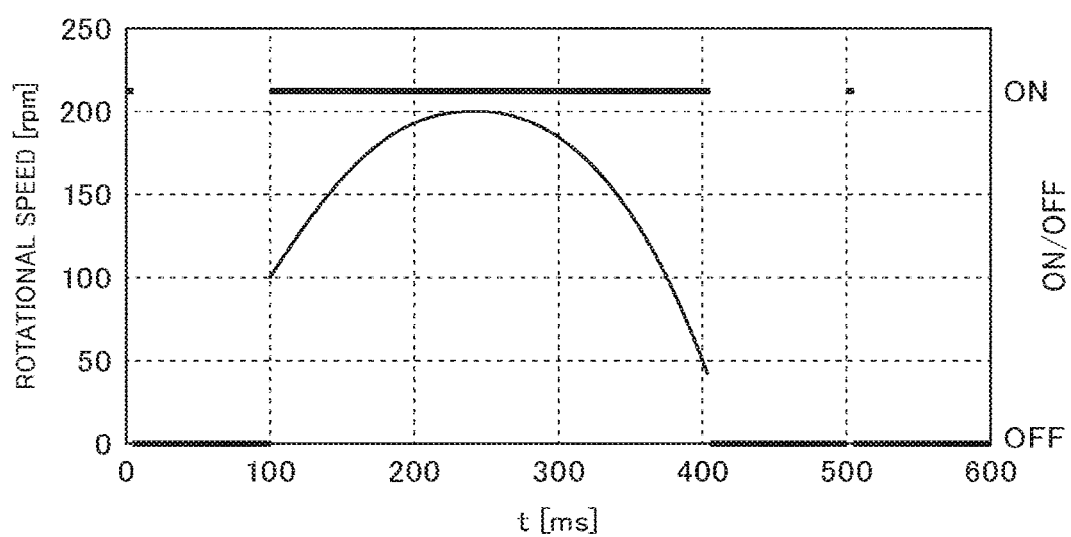
FIG. 6 is a waveform chart illustrating exemplary variable supply control of a power supply control unit according to Modification 1 of the first embodiment.

More specifically, a switch (not illustrated) for switching between ON and OFF of power supplied from the battery 61 to the first and second rotation information detection function units 51 and 52 is alternately turned on and off at certain intervals respectively set in advance for ON and OFF states (1 [ms] for ON state and 99 [ms] for OFF state in the example of FIG. 6), as illustrated in FIG. 6.

In this case, assume, for example, that the driver riding in a vehicle equipped with the idling stop function steers the steering wheel 31 to rotate the motor rotating shaft 44a after the IG switch 62 is turned off by this idling stop function, while waiting for the lights to change.

Then, as illustrated in, for example, FIG. 6, when the motor rotational speed becomes equal to or higher than the set rotational speed ωt (50 [rpm] in the example of FIG. 6), the power supply control unit 50 makes switching from the current, intermittently supplied state to the normally supplied state. Referring to FIG. 6, a fine curved line represents the motor rotational speed and a bold straight line represents ON/OFF of the switch.

When the motor rotational speed becomes lower than the set rotational speed ωt, the power supply control unit 50 makes switching from the normally supplied state to the intermittently supplied state.

With this operation, when steering is performed such that the motor rotational speed becomes the set rotational speed ωt or more while the IG switch 62 is OFF, the first and second counter units 471c and 472c can count values according to changes of the first and second digital rotation position signals in full operation in the normally supplied state, and the first memory unit 471d and the second memory unit 472d can store the first count values Cs1 and Cc1 and the second count values Cs2 and Cc2 in full operation.

Effects of Modification 1

(1) The motor drive control device 45 according to Modification 1 of the first embodiment switches power from the battery 61, from the intermittently supplied state to the continuously supplied state when the power supply control unit 50 detects a motor rotational speed of the electric motor 44 equal to or higher than the rotational speed ωt set in advance, while the IG switch 62 is OFF.

With this configuration, when the driver steers the steering wheel 31 while the IG switch 62 is OFF, if the motor rotational speed becomes equal to or higher than the set rotational speed ωt upon this steering, switching is made from the intermittently supplied state to the normally supplied state to allow full operation of the first and second rotation information detection function units 51 and 52. This allows more reliable measurement of an amount of change in motor rotation position when the motor rotational speed becomes the set rotational speed ωt or more.

Modification 2 of First Embodiment

Modification 2 of the first embodiment will be described below with reference to FIG. 7.

Modification 2 is different from the first embodiment in that in the first embodiment the power supply control unit 50 intermittently supplies power from the battery 61 to all constituent units of the first and second rotation information detection function units 51 and 52 while the IG switch 62 is OFF, but in Modification 2 power is intermittently supplied to only some constituent units.

The same reference numerals as in the first embodiment denote the same constituent units, and a description thereof will be omitted as appropriate, while only different parts will be described in detail hereinafter.

Figure 7:
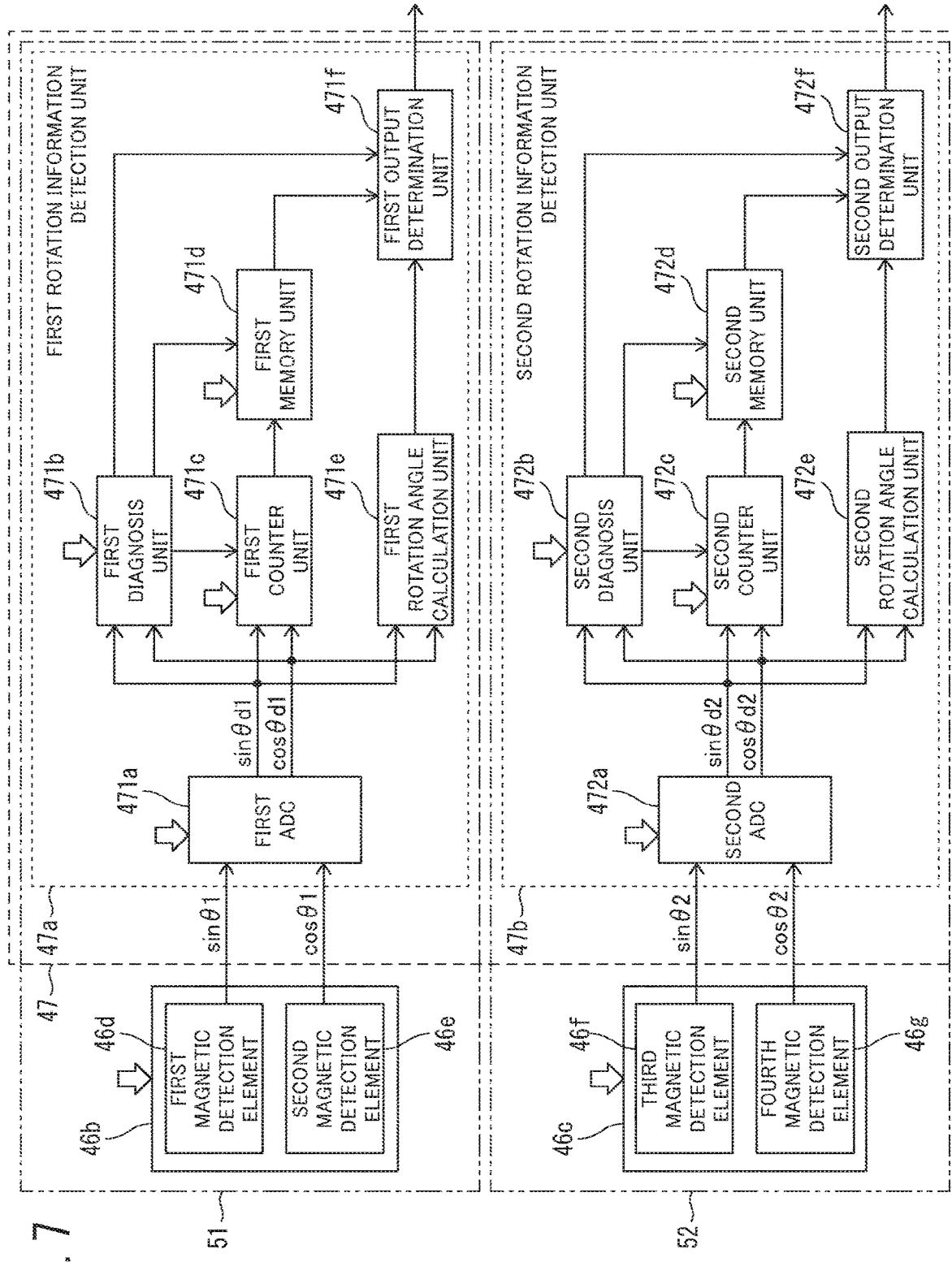
FIG. 7 is a block diagram illustrating an exemplary object to be supplied with power while an ignition switch for a power supply control unit according to Modification 2 of the first embodiment is OFF.

The power supply control unit 50 according to Modification 2 is configured to intermittently supply power from the battery 61 to constituent units marked with downward arrows and completely stop supplying power to constituent units marked with no arrows, as illustrated in FIG. 7, while the IG switch 62 is OFF.

More specifically, the power supply control unit 50 according to Modification 2 intermittently supplies power from the battery 61 to only the first and second rotation position information detection units 46b and 46c, the first and second ADCs 471a and 472a, the first and second diagnosis units 471b and 472b, the first and second counter units 471c and 472c, and the first and second memory units 471d and 472d, while the IG switch 62 is OFF. These constituent units will also be abbreviated as "power supplied constituent units" hereinafter.

The power supply control unit 50 according to Modification 2 completely stops (cuts off) power supplied from the battery 61 to the first and second rotation angle calculation units 471e and 472e and the first and second output determination units 471f and 472f, while the IG switch 62 is OFF. These constituent units will also be abbreviated as "power stopped constituent units" hereinafter.

More specifically, in the power supply control unit 50 according to Modification 2, switches (not illustrated) for turning on and off power supplied from the battery 61 are individually provided for the power supplied constituent units and the power stopped constituent units of the first and second rotation information detection function units 51 and 52.

The power supply control unit 50 alternately turns on and off the switches corresponding to the power supplied constituent units at a preset certain interval to intermittently supply power to the power supplied constituent units, while the IG switch 62 is OFF.

Upon application of the configuration according to Modification 1, in the intermittently supplied state, when the driver steers the steering wheel 31 and the motor rotational speed becomes equal to or higher than a rotational speed ωt set in advance, the switches corresponding to the power supplied constituent units are kept ON to switch the state of power supply to the power supplied constituent units from the intermittently supplied state to the normally supplied state. When the motor rotational speed lowers from the set rotational speed ωt or more to less than the set rotational speed ωt, the state of power supply to the power supplied constituent units is switched from the normally supplied state to the intermittently supplied state.

The power supply control unit 50 keeps the switches corresponding to the power stopped constituent units OFF to cut off power supplied to the power stopped constituent units, while the IG switch 62 is OFF.

Effects of Modification 2

Modification 2 of the first embodiment has the following effects, in addition to the effects of the first embodiment.

(1) In the motor drive control device 45 according to Modification 2, the power supply control unit 50 intermittently supplies power from the battery 61 to the first and second ADCs 471a and 472a, the first and second rotation position information detection units 46b and 46c, the first and second diagnosis units 471b and 472b, the first and second counter units 471c and 472c, and the first and second memory units 471d and 472d in the first and second rotation information detection function units 51 and 52 and cuts off power supplied to the remaining constituent units, while the IG switch 62 is OFF.

With this configuration, while the IG switch 62 is OFF, power can be supplied to only constituent units which need to be actuated in OFF state (constituent units required to measure an amount of change in motor rotation position) in addition to intermittent power supply, thus more reliably cutting the power consumption in OFF state.

Modification 3 of First Embodiment

Modification 3 of the first embodiment will be described below.

Modification 3 is different from the first embodiment in that Modification 3 includes a first and a second MUXs (MUltipleXers) 471g and 472g located upstream of the first and second ADCs 471a and 472a, and monitoring potentials are input to the first and second ADCs 471a and 472a via the first and second MUXs 471g and 472g. Abnormality diagnosis of the first and second MUXs 471g and 472g and the first and second ADCs 471a and 472a is performed based on the A/D conversion result of the monitoring potentials.

The same reference numerals as in the first embodiment denote the same constituent units, and a description thereof will be omitted as appropriate, while only different parts will be described in detail hereinafter.

Figure 8:
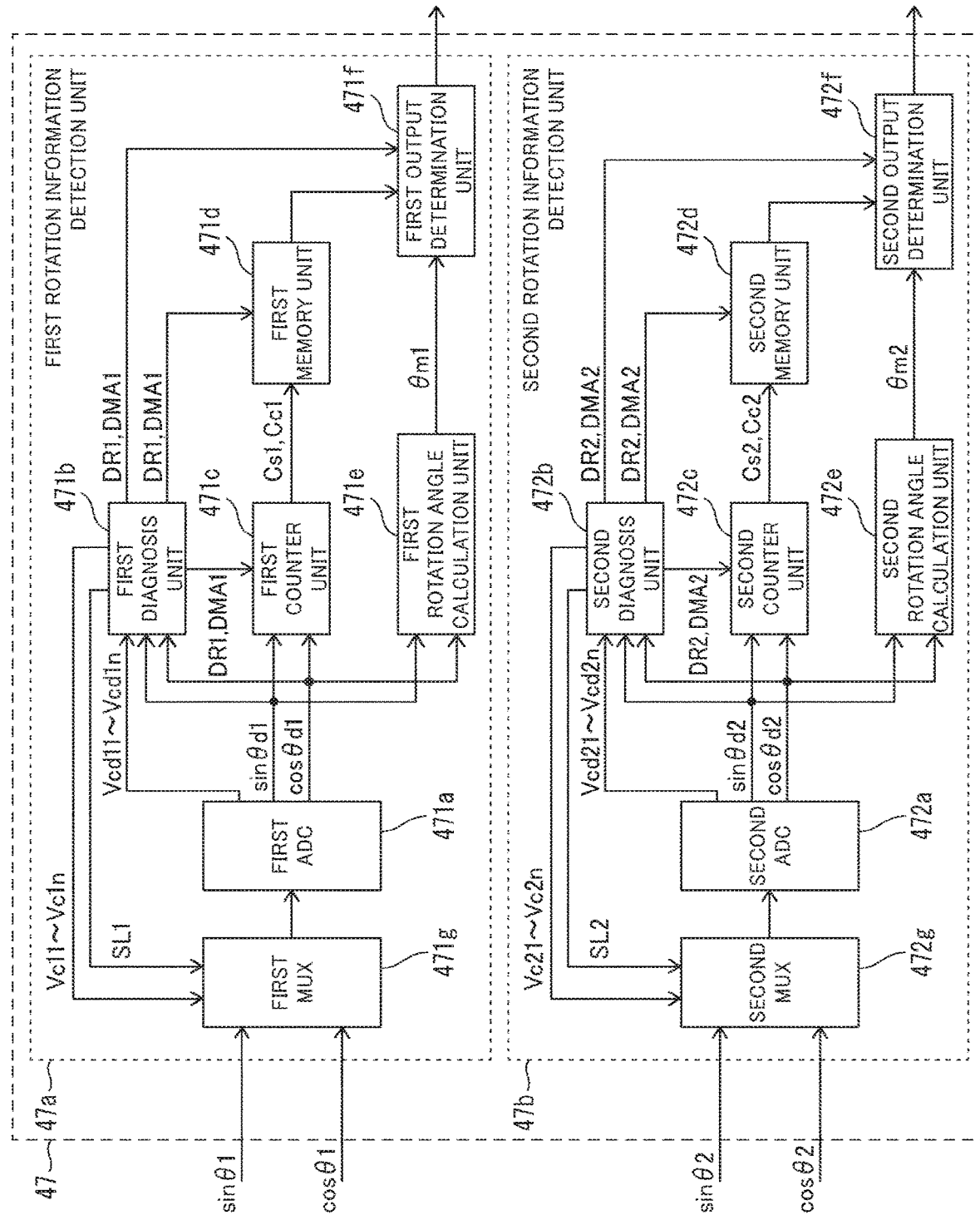
FIG. 8 is a block diagram illustrating a specific configuration example of rotation information detection function units according to Modification 3 of the first embodiment.

The first and second rotation information detection units 47a and 47b according to Modification 3 newly include the first and second MUXs 471g and 472g, as illustrated in FIG. 8.

The first MUX 471g includes pluralities of signal input terminals and selection signal input terminals and at least one output terminal (none are illustrated), selects a signal to be output to the first ADC 471a from signals input to the plurality of input terminals, based on a first selection signal SL1 from the first diagnosis unit 471b, and outputs the selected signal to the first ADC 471a.

In Modification 3, the types of signals input to the first ADC 471a include the first motor rotation position signal (sin θ1, cos θ1) output from the first rotation position information detection unit 46b, and first monitoring potential signals Vc11 to Vc1n (n is a natural number of 1 or more) for abnormality diagnosis of the first ADC 471a output from the first diagnosis unit 471b. Therefore, the first MUX 471g sequentially selects these signals in accordance with the first selection signal SL1 and outputs them to the first ADC 471a.

The first ADC 471a according to Modification 3 converts analog signals sequentially input from the first MUX 471g into digital signals and outputs them to the downstream constituent units.

More specifically, the first ADC 471a according to Modification 3 converts the analog, first motor rotation position signal (sin θ1, cos θ1) input from the first MUX 471g into the first digital rotation position signal (sin θd1, cos θd1) and outputs it to each of the first diagnosis unit 471b, the first counter unit 471c, and the first rotation angle calculation unit 471e.

The first ADC 471a according to Modification 3 further converts the analog, first monitoring potential signals Vc11 to Vc1n input from the first MUX 471g into first digital potential signals Vcd11 to Vcd1n as digital, first monitoring potential signals and outputs them to the first diagnosis unit 471b.

Figure 9A:
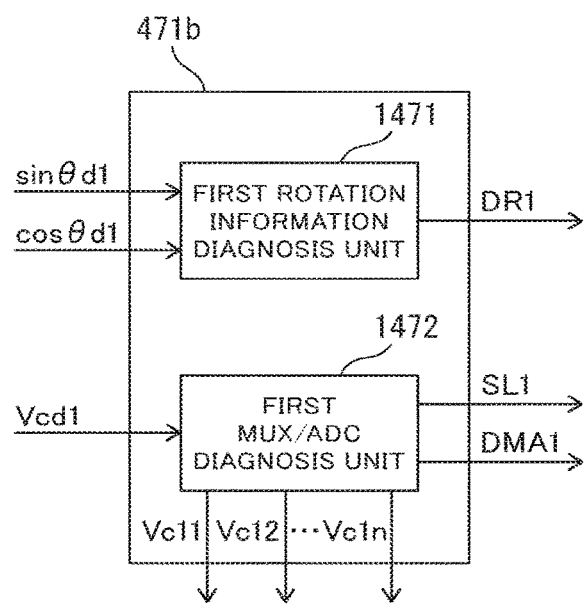
FIGS. 9A and 9B are block diagrams illustrating specific configuration examples of a first diagnosis unit and a second diagnosis unit according to Modification 3 of the first embodiment.

The first diagnosis unit 471b according to Modification 3 includes a first rotation information diagnosis unit 1471 and a first MUX/ADC diagnosis unit 1472, as illustrated in FIG. 9A.

The first rotation information diagnosis unit 1471 serves as a constituent unit including the same function as that of the first diagnosis unit 471b according to the first embodiment. In other words, the first rotation information diagnosis unit 1471 diagnoses an abnormality of the first digital rotation position signal (sin θd1, cos θd1), based on equation (1) in the first embodiment, and outputs to each of the first counter unit 471c, the first memory unit 471d, and the first output determination unit 471f, "1" for the presence of an abnormality and "0" for the absence of an abnormality as a first diagnosis result flag DR1.

The first MUX/ADC diagnosis unit 1472 generates the first monitoring potential signals Vc11 to Vc1n from a voltage VCC applied from the battery 61 and inputs the generated first monitoring potential signals Vc11 to Vc1n to the input terminals of the first MUX 471g.

The first MUX/ADC diagnosis unit 1472 further generates the first selection signal SL1 for outputting the first motor rotation position signal (sin θ1, cos θ1) and the first monitoring potential signals Vc11 to Vc1n input to the input terminals of the first MUX 471g to the first ADC 471a while sequentially switching them using a preset order and time interval and inputs the generated first selection signal SL1 to the selection signal input terminal of the first MUX 471g.

Note, however, that the first MUX/ADC diagnosis unit 1472 according to Modification 3 inputs the first selection signal SL1, for outputting the first monitoring potential signals Vc11 to Vc1n while sequentially switching them, to the selection signal input terminal only once immediately after a change to ON every time the IG switch 62 changes from OFF to ON. While the IG switch 62 is subsequently kept ON, the first MUX/ADC diagnosis unit 1472 inputs to the selection signal input terminal, the first selection signal SL1 for outputting the first motor rotation position signal (sin θ1, cos θ1) while alternately switching them.

The first MUX/ADC diagnosis unit 1472 compares each of the first digital potential signals Vcd11 to Vcd1n input from the first ADC 471a with a corresponding one of preset first comparison potentials Vct11 to Vct1n, having the same suffix.

In this case, the first comparison potentials Vct11 to Vct1n take values having their respective tolerances, and it is determined that no abnormality has occurred in the first MUX 471g and the first ADC 471a when all the first digital potential signals Vcd11 to Vcd1n fall within the tolerances (for example, values between the upper and lower limits) of the first comparison potentials Vct11 to Vct1n. It is determined that an abnormality has occurred in the first MUX 471g and the first ADC 471a when at least one of the first digital potential signals Vcd11 to Vcd1n falls outside the tolerance.

When it is determined that no abnormality has occurred, the first MUX/ADC diagnosis unit 1472 outputs "0" as a first ADC diagnosis result flag DMA1 to each of the first counter unit 471c, the first memory unit 471d, and the first output determination unit 471f. When it is determined that an abnormality has occurred, the first MUX/ADC diagnosis unit 1472 outputs "1" as the first ADC diagnosis result flag DMA1 to each of the first counter unit 471c, the first memory unit 471d, and the first output determination unit 471f.

The first counter unit 471c and the first memory unit 471d according to Modification 3 stop their operations when at least one of the first diagnosis result flag DR1 and the first ADC diagnosis result flag DMA1 is "1".

The first output determination unit 471f according to Modification 3 outputs the first diagnosis result flag DR1, the first ADC diagnosis result flag DMA1, the first motor rotation angle θm1, and the first count values Cs1 and Cc1 to the controller 48 when the first diagnosis result flag DR1 and the first ADC diagnosis result flag DMA1 are both "0".

The first output determination unit 471f stops outputting the first motor rotation angle θm1 and the first count values Cs1 and Cc1 to the controller 48 and outputs only the first diagnosis result flag DR1 and the first ADC diagnosis result flag DMA1 to the controller 48, when at least one of the first diagnosis result flag DR1 and the first ADC diagnosis result flag DMA1 is "1".

The second MUX 472g and the second ADC 472a according to Modification 3 have the same configurations as those of the first MUX 471g and the first ADC 471a. In other words, since the operation details are the same except that the second motor rotation position signal (sin θ2, cos θ2), the second digital rotation position signal (sin θd2, cos θd2), a second selection signal SL2, second monitoring potential signals Vc21 to Vc2n, and second digital potential signals Vcd21 to Vcd2n are used, a description thereof will be omitted.

Figure 9B:
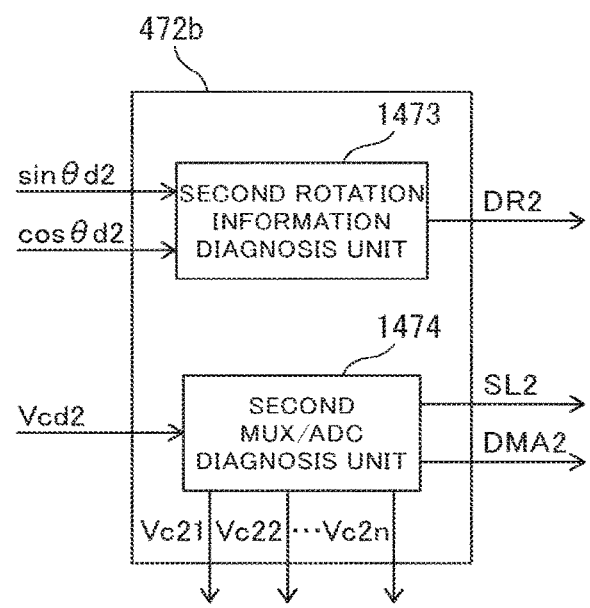

The second diagnosis unit 472b according to Modification 3 includes a second rotation information diagnosis unit 1473 and a second MUX/ADC diagnosis unit 1474, as illustrated in FIG. 9B.

Since the second rotation information diagnosis unit 1473 has the same configuration as that of the first rotation information diagnosis unit 1471 except that the second digital rotation position signal (sin θd2, cos θd2) and the second diagnosis result flag DR2 are used, a description thereof will be omitted.

The second MUX/ADC diagnosis unit 1474 has the same configuration as that of the first MUX/ADC diagnosis unit 1472. In other words, since the operation details are the same except that the second digital rotation position signal (sin θd2, cos θd2), second digital potential signals Vcd21 to Vcd2$n$, a second selection signal SL2, a second ADC diagnosis result flag DMA2, and second comparison potentials Vct21 to Vct2$n$ are used, a description thereof will be omitted.

The second counter unit 472c and the second memory unit 472d according to Modification 3 stop their operations when at least one of the second diagnosis result flag DR2 and the second ADC diagnosis result flag DMA2 is "1".

The second output determination unit 472f according to Modification 3 outputs the second diagnosis result flag DR2, the second ADC diagnosis result flag DMA2, the second motor rotation angle θm2, and the second count values Cs2 and Cc2 to the controller 48 when the second diagnosis result flag DR2 and the second ADC diagnosis result flag DMA2 are both "0".

The second output determination unit 472f stops outputting the second motor rotation angle θm2 and the second count values Cs2 and Cc2 to the controller 48 and outputs only the second diagnosis result flag DR2 and the second ADC diagnosis result flag DMA2 to the controller 48, when at least one of the second diagnosis result flag DR2 and the second ADC diagnosis result flag DMA2 is "1".

The controller 48 according to Modification 3 determines the presence or absence of an abnormality and identifies or estimates an abnormality area from the first diagnosis result flag DR1 and the first ADC diagnosis result flag DMA1, and the second diagnosis result flag DR2 and the second ADC diagnosis result flag DMA2 input from the first and second rotation information detection function units 51 and 52.

More specifically, the controller 48 according to Modification 3 can identify abnormalities of the first MUX 471g and the first ADC 471a or the second MUX 472g and the second ADC 472a when the first ADC diagnosis result flag DMA1 or the second ADC diagnosis result flag DMA2 is "1".

When the first ADC diagnosis result flag DMA1 and the second ADC diagnosis result flag DMA2 are "0," and the first diagnosis result flag DR1 or the second diagnosis result flag DR2 is "1," since an abnormality has occurred in the input motor rotation position signal, the controller 48 can estimate that an abnormality has occurred in the first rotation position information detection unit 46b or the second rotation position information detection unit 46c, or the multipolar ring magnet 46a.

(Operation)

An operation according to Modification 3 will be described below.

Assume now that the IG switch 62 changes from OFF to ON, and power is supplied from the battery 61 to the first and second rotation information detection function units 51 and 52 via the power supply control unit 50 in the normally supplied state.

In this case, by using the normal ranges of use (0 to VCC) for the first and second ADCs 471a and 472a as a reference, five types of the first and second monitoring potential signals Vc11 to Vc15 and Vc21 to Vc25: "Vc11=Vc21=VCC*½," "Vc12=Vc22=VCC*⅓," "Vc13=Vc23=VCC*⅔," "Vc14=Vc24=VCC", and "Vc15=Vc25=0" are set.

In other words, the first monitoring potential signals Vc11 to Vc15 are input from the first diagnosis unit 471b to the input terminals of the first MUX 471g, and the second monitoring potential signals Vc21 to Vc25 are input from the second diagnosis unit 472b to the second MUX 472g.

When the IG switch 62 changes from OFF to ON, the first and second diagnosis units 471b and 472b output to the first and second MUXs 471g and 472g, the first and second selection signals SL1 and SL2 for selectively outputting the first and second monitoring potential signals Vc11 to Vc15 and Vc21 to Vc25.

More specifically, the first and second diagnosis units 471b and 472b output to the first and second MUXs 471g and 472g, the first and second selection signals SL1 and SL2 for outputting the first and second monitoring potential signals Vc11 to Vc15 and Vc21 to Vc25 to the first and second ADCs 471a and 472a while sequentially switching them at a preset time interval required in A/D conversion.

With this operation, the first MUX 471g sequentially outputs the first monitoring potential signals Vc11 to Vc15 to the first ADC 471a at a preset time interval, in accordance with the input first selection signal SL1. The first ADC 471a sequentially converts the sequentially input first monitoring potential signals Vc11 to Vc15 into the first digital potential signals Vcd11 to Vcd15 and sequentially outputs them to the first diagnosis unit 471b.

Similarly, the second MUX 472g outputs the second monitoring potential signals Vc21 to Vc25 to the second ADC 472a at a preset time interval, in accordance with the input second selection signal SL2. The second ADC 472a sequentially converts the sequentially input second monitoring potential signals Vc21 to Vc25 into the second digital potential signals Vcd21 to Vcd25 and sequentially outputs them to the second diagnosis unit 472b.

The first diagnosis unit 471b sequentially compares each of the sequentially input first digital potential signals Vcd11 to Vcd15 with a corresponding one of the first comparison potentials Vct11 to Vct15, having the same suffix, and generates a first ADC diagnosis result flag DMA1 based on this comparison result. Similarly, the second diagnosis unit 472b sequentially compares each of the sequentially input second digital potential signals Vcd21 to Vcd25 with a corresponding one of the second comparison potentials Vct21 to Vct25 and generates a second ADC diagnosis result flag DMA2 based on this comparison result.

The first diagnosis unit 471b generates the first ADC diagnosis result flag DMA1 of "0" when it determines that all the first digital potential signals Vcd11 to Vcd15 fall within the tolerances indicated by the first comparison potentials Vct11 to Vct15, and generates the first ADC diagnosis result flag of "1" when it determines that at least one of these signals falls outside the tolerance.

The second diagnosis unit 472b generates the second ADC diagnosis result flag DMA2 of "0" when it determines that all the second digital potential signals Vcd21 to Vcd25 fall within the tolerances indicated by the second comparison potentials Vct21 to Vct25, and generates the second ADC diagnosis result flag of "1" when it determines that at least one of these signals falls outside the tolerance.

The first and second diagnosis units 471b and 472b output the generated first and second ADC diagnosis result flags DMA1 and DMA2 to the first and second counter units 471c and 472c, the first and second memory units 471d and 472d, and the first and second output determination units 471f and 472f.

The first and second counter units 471c and 472c and the first and second memory units 471d and 472d stop their subsequent operations when the first and second ADC diagnosis result flags DMA1 and DMA2 are "1", and these units perform their normal operations subsequently when these flags are "0".

When the first and second ADC diagnosis result flags DMA1 and DMA2 are "1", the first and second output determination units 471f and 472f output the first and second diagnosis result flags DR1 and DR2 and the first and second ADC diagnosis result flags DMA1 and DMA2 to the controller 48. The first and second output determination units 471f and 472f stop their subsequent processing for outputting the first and second motor rotation angles θm1 and θm2, the first count values Cs1 and Cc1, and the second count values Cs2 and Cc2.

When the first and second ADC diagnosis result flags DMA1 and DMA2 are "0", the first and second output determination units 471f and 472f output the first and second diagnosis result flags DR1 and DR2 and the first and second ADC diagnosis result flags DMA1 and DMA2 to the controller 48 and perform their normal output operations subsequently.

The first ADC 471a and the second ADC 472a correspond to an A/D converter, the first MUX/ADC diagnosis unit 1472 and the second MUX/ADC diagnosis unit 1474 correspond to an A/D converter diagnosis unit, and the first MUX 471g and the second MUX 472g correspond to a monitoring potential signal input unit.

Effects of Modification 3

Modification 3 of the first embodiment has the following effects, in addition to the effects of the first embodiment.

(1) In the motor drive control device 45 according to Modification 3, the first and second rotation information detection function units 51 and 52 include the first and second ADCs 471a and 472a which convert the analog, first and second motor rotation position signals into the digital, first and second digital rotation position signals, the first and second MUXs 471g and 472g which input the analog, first and second monitoring potential signals Vc11 to Vc1n and Vc21 to Vc2n to the first and second ADCs 471a and 471b, and the first and second MUX/ADC diagnosis units 1472 and 1474 which compare the first and second digital potential signals Vcd11 to Vcd1n and Vcd21 to Vcd2n obtained by conversion into digital signals by the first and second ADCs 471a and 472a with the preset first and second comparison potentials Vct11 to Vct1n and Vct21 to Vct2n to diagnose abnormalities of the first and second ADCs 471a and 471b and the first and second MUXs 471g and 472g based on the comparison result.

With this configuration, the first and second ADCs 471a and 471b and the first and second MUXs 471g and 472g can be diagnosed as abnormal, based on the first and second digital potential signals Vcd11 to Vcd1n and Vcd21 to Vcd2n obtained by A/D-converting the analog, the first and second monitoring potential signals Vc11 to Vc1n and Vc21 to Vc2n using the first and second ADCs 471a and 472a.

With this operation, abnormalities of the first ADC 471a and the first MUX 471g, and the second ADC 472a and the second MUX 472g can be respectively identified.

Modification 4 of First Embodiment

Modification 4 of the first embodiment will be described below.

Modification 4 is different from the first embodiment in that the counter function units of the first and second counter units 471c and 472c are dualized, and the count values obtained by the dualized counter function units are compared with each other to allow the first and second counter units 471c and 472c to diagnose their own abnormalities. Another difference from the first embodiment lies in that two address areas are set in each of the first and second memory units 471d and 472d, the count value obtained by one of the dualized counter function units of the first and second counter units 471c and 472c is stored in one of the two address areas of each memory unit while the other count value is stored in the other address area, and these stored count values are compared between the areas to allow the first and second memory units 471d and 472d to diagnose their own abnormalities.

The same reference numerals as in the first embodiment denote the same constituent units, and a description thereof will be omitted as appropriate, while only different parts will be described in detail hereinafter.

Figure 10A:
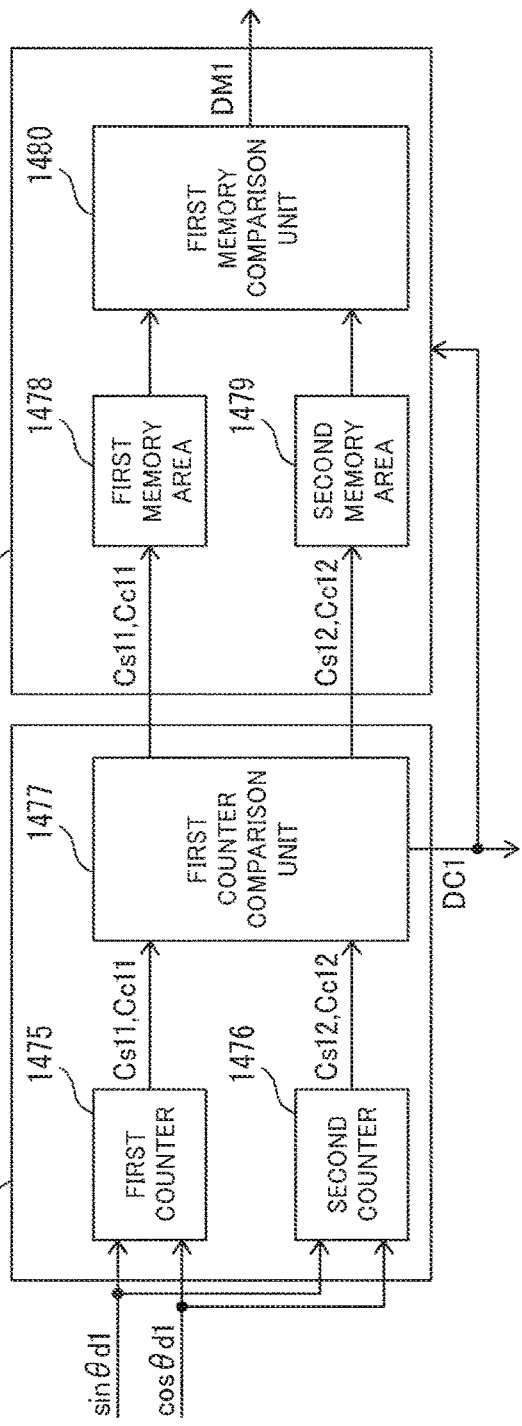
FIG. 10A is a block diagram illustrating a specific configuration example of a first counter unit and a first memory unit according to Modification 4 of the first embodiment.

The first counter unit 471c according to Modification 4 includes a first counter 1475, a second counter 1476, and a first counter comparison unit 1477, as illustrated in FIG. 10A.

The first and second counters 1475 and 1476 count the values of synchronously input sin θd1 and cos θd1 for each of their quadrants and output first sin count values Cs11 and Cs12 and first cos count values Cc11 and Cc12 to the first counter comparison unit 1477 as the count values.

The first counter comparison unit 1477 compares the count values Cs11 and Cc11 input from the first counter 1475 with the count values Cs12 and Cc12 input from the second counter 1476. It is determined that no abnormality has occurred in the count values and "0" is set as a first counter diagnosis result flag DC1 when "Cs11=Cs12" and "Cc11=Cc12" hold, and that an abnormality has occurred in the count values and "1" is set as such a flag when they do not hold. The first counter comparison unit 1477 outputs the set first counter diagnosis result flag DC1 to each of the first memory unit 471d and the first output determination unit 471f.

The first counter comparison unit 1477 further outputs the first sin count values Cs11 and Cs12 and the first cos count values Cc11 and Cc12 to the first memory unit 471d when the first counter diagnosis result flag DC1 is "0" and stops outputting them when the first counter diagnosis result flag DC1 is "1".

The first memory unit 471d according to Modification 4 includes a first memory area 1478, a second memory area 1479, and a first memory comparison unit 1480, as illustrated in FIG. 10A.

The first memory area 1478 serves as a memory area which stores the first sin count value Cs11 and the first cos count value Cc11.

The second memory area 1479 serves as a memory area which stores the first sin count value Cs12 and the first cos count value Cc12.

In Modification 4, the first memory unit 471d is configured to invert the logic of the first sin count value Cs12 and the first cos count value Cc12 and store them in the second memory area 1479. In this case, the count values are logically inverted and stored to allow the downstream, first memory comparison unit 1480 to detect a memory fixation abnormality as well.

The first memory comparison unit 1480 determines whether or not the first sin count value Cs11 and the first cos count value Cc11 stored in the first memory area 1478 are equal to the first sin count value Cs12 and the first cos count value Cc12 logically inverted and stored in the second memory area 1479. More specifically, the first memory comparison unit 1480 determines whether or not the former and latter count values are equal after returning the inverted logic to the original state. "0" is set as a first memory diagnosis result flag DM1 when these count values are totally equal, and "1" is set as such a flag when they are different. The set first memory diagnosis result flag DM1 is output to the first output determination unit 471*f*.

The first memory unit 471*d* according to Modification 4 is configured to stop the operation when the first counter diagnosis result flag DC1 input from the first counter unit 471*c* is "1".

Figure 10B:
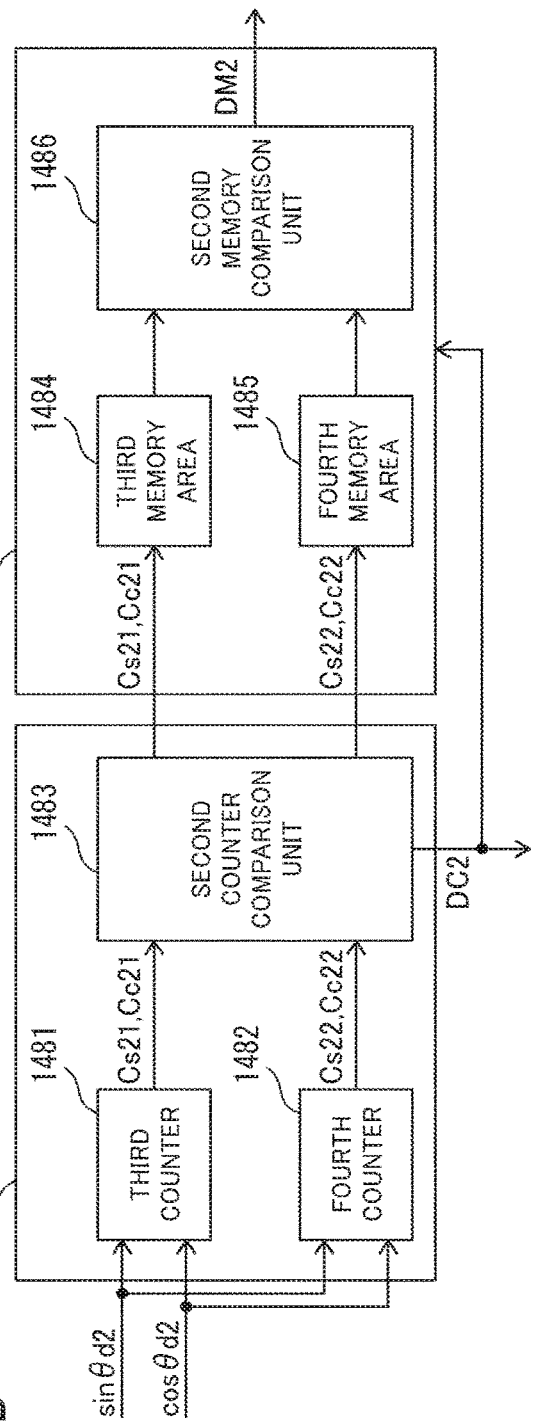
FIG. 10B is a block diagram illustrating a specific configuration example of a second counter unit and a second memory unit according to Modification 4 of the first embodiment.

The second counter unit 472*c* according to Modification 4 includes a third counter 1481, a fourth counter 1482, and a second counter comparison unit 1483, as illustrated in FIG. 10B.

The third counter 1481, the fourth counter 1482, and the second counter comparison unit 1483 have the same configurations as those of the first counter 1475, the second counter 1476, and the first counter comparison unit 1477. In other words, since the operation details are the same except that the sin θd2 and cos θd2, second sin count values Cs21 and Cs22, second cos count values Cc21 and Cc22, and a second counter diagnosis result flag DC2 are used, a description thereof will be omitted.

The second memory unit 472*d* according to Modification 4 includes a third memory area 1484, a fourth memory area 1485, and a second memory comparison unit 1486, as illustrated in FIG. 10B.

The third memory area 1484, the fourth memory area 1485, and the second memory comparison unit 1486 have the same configurations as those of the first memory area 1478, the first memory area 1479, and the first memory comparison unit 1480. In other words, since the operation details are the same except that the second sin count values Cs21 and Cs22, the second cos count values Cc21 and Cc22, and the second counter diagnosis result flag DC2 are used, a description thereof will be omitted.

The first output determination unit 471*f* according to Modification 4 outputs the first diagnosis result flag DR1, the first counter diagnosis result flag DC1, and the first memory diagnosis result flag DM1 to the controller 48 when at least one of these diagnosis result flags DR1, DC1, and DM1 is "1". Subsequently, the first output determination unit 471*f* stops processing for outputting the first motor rotation angle θm1, the first sin count values Cs11 and Cs12, and the first cos count values Cc11 and Cc12 to the controller 48.

The first output determination unit 471*f* according to Modification 4 outputs the first diagnosis result flag DR1, the first counter diagnosis result flag DC1, and the first memory diagnosis result flag DM1 to the controller 48 when all these diagnosis result flags DR1, DC1, and DM1 are "0". Subsequently, the first output determination unit 471*f* performs processing for outputting these diagnosis result flags DR1, DC1, and DM1, the first motor rotation angle θm1, the first sin count values Cs11 and Cs12, and the first cos count values Cc11 and Cc12 to the controller 48.

The second output determination unit 472*f* according to Modification 4 has the same configuration as that of the first output determination unit 471*f* according to Modification 3. In other words, since the operation details are the same except that the second diagnosis result flag DR2, the second counter diagnosis result flag DC2, the second memory diagnosis result flag DM2, the second motor rotation angle θm2, the second sin count values Cs21 and Cs22, and the second cos count values Cc21 and Cc22 are used, a description thereof will be omitted.

The controller 48 according to Modification 4 can identify, based on the first counter diagnosis result flag DC1 and the first memory diagnosis result flag DM1 from the first rotation information detection function unit 51, an abnormality of the first counter unit 471*c* when the first counter diagnosis result flag DC1 is "1" and an abnormality of the first memory unit 471*d* when the first memory diagnosis result flag DM1 is "1".

The controller 48 according to Modification 4 can also identify, based on the second counter diagnosis result flag DC2 and the second memory diagnosis result flag DM2 from the second rotation information detection function unit 52, an abnormality of the second counter unit 472*c* when the second counter diagnosis result flag DC2 is "1" and an abnormality of the second memory unit 472*d* when the second memory diagnosis result flag DM2 is "1".

(Operation)

An operation according to Modification 4 will be described below.

Assume now that the first and second digital rotation position signals (sin θd1, cos θd1) and (sin θd2, cos θd2) are input to the first and second counter units 471*c* and 472*c*.

Then, the first and second counters 1475 and 1476 of the first counter unit 471*c* count sin θd1 and cos θd1 for each of their quadrants and output the first sin count values Cs11 and Cs12 and the first cos count values Cc11 and Cc12 to the first counter comparison unit 1477.

The first counter comparison unit 1477 compares the respective count values with each other to determine whether or not "Cs11=Cs12" and "Cc11=Cc12" hold and diagnoses these count values as normal when it determines that they hold and as abnormal when it determines that they do not hold. The first counter comparison unit 1477 outputs the first counter diagnosis result flag DC1 having a value according to the diagnosis result to each of the first memory unit 471*d* and the first output determination unit 471*f*. In this case, when these count values are normal, the first counter comparison unit 1477 further outputs the first sin count values Cs11 and Cs12 and the first cos count values Cc11 and Cc12 to the first memory unit 471*d*.

The first memory unit 471*d* stores the input first sin count value Cs11 and first cos count value Cc11 in the first memory area 1478, while it inverts the logic of the input first sin count value Cs12 and first cos count value Cc12 and stores them in the second memory area 1479.

The first memory comparison unit 1480 compares the first sin count value Cs11 and the first cos count value Cc11 stored in the first memory area 1478 with the first sin count value Cs12 and the first cos count value Cc12 stored in the second memory area 1479 after returning the logic to the original state. The first memory comparison unit 1480 determines whether or not "Cs11=Cs12" and "Cc11=Cc12" hold and diagnoses these count values as normal when it determines that they hold and as abnormal when it determines that they do not hold. The first memory comparison unit 1480 outputs the first memory diagnosis result flag DM1 having a value according to the diagnosis result to the first output determination unit 471*f*.

Since the operations of the second counter unit 472*c* and the second memory unit 472*d* are the same as those of the first counter unit 471*c* and the first memory unit 471*d* except that different signals are used, a description thereof will be omitted.

The controller 48 determines whether or not an abnormality has occurred in the first counter unit 471c and the first memory unit 471d, based on the first counter diagnosis result flag DC1 and the first memory diagnosis result flag DM1 from the first rotation information detection function unit 51. Thus, the controller 48 can identify an abnormality of the first counter unit 471c when the first counter diagnosis result flag DC1 is "1" and an abnormality of the first memory unit 471d when the first memory diagnosis result flag DM1 is "1".

The controller 48 also determines whether or not an abnormality has occurred in the second counter unit 472c and the second memory unit 472d, based on the second counter diagnosis result flag DC2 and the second memory diagnosis result flag DM2 from the second rotation information detection function unit 52. Thus, the controller 48 can identify an abnormality of the second counter unit 472c when the second counter diagnosis result flag DC2 is "1" and an abnormality of the second memory unit 472d when the second memory diagnosis result flag DM2 is "1".

The first and second counters 1475 and 1476 and the third and fourth counters 1481 and 1482 correspond to a change amount measurement unit, and the first and second memory areas 1478 and 1479 and the third and fourth memory areas 1484 and 1485 correspond to a change amount storage unit.

The first and second counter comparison units 1277 and 1480 and the first and second memory comparison units 1480 and 1486 correspond to a measurement abnormality diagnosis unit.

Effects of Modification 4

Modification 4 has the following effects, in addition to the effects of the first embodiment.

(1) In the motor drive control device 45 according to Modification 4, the first and second counters 1475 and 1476 and the third and fourth counters 1481 and 1482 of the first and second counter units 471c and 472c measure amounts of change in rotation position (the first sin count values Cs11 and Cs12, the first cos count values Cc11 and Cc12, the second sin count values Cs21 and Cs22, and the second cos count values Cc21 and Cc22) of the electric motor 44 based on the first and second motor rotation position signals detected by the first and second rotation position information detection units 46b and 46c. The first and second counter comparison units 1277 and 1480 of the first and second counter units 471c and 472c diagnose abnormalities of the first and second counter units 471c and 472c.

The first and second memory units 471d and 472d store the amounts of change measured by the first and second counters 1475 and 1476 and the third and fourth counters 1481 and 1482 in the first and second memory areas 1478 and 1479 and the third and fourth memory areas 1484 and 1485. The first and second memory comparison units 1480 and 1486 of the first and second memory units 471d and 472d diagnose abnormalities of the first and second memory units 471d and 472d.

The first and second output determination units 471f and 472f output the amounts of change and the abnormality diagnosis results (the first and second counter diagnosis result flags DC1 and DC2 and the first and second memory diagnosis result flags DM1 and DM2) to the controller 48.

With this configuration, the first and second counter units 471c and 472c and the first and second memory units 471d and 472d can individually diagnose their own abnormalities, which can thus be individually identified.

In Modification 4, since the device is configured to invert the logic of the respective count values and store them in the second memory area 1479 and the fourth memory area 1485, when a fixation abnormality has occurred in any memory area, this state can be detected as an abnormality.

(Other Modifications)

(1) In the first embodiment and each Modification, two systems of rotation information detection function units are used, but the present invention is not limited to this configuration, and three or more systems of rotation information detection function units may also be used.

(2) In the first embodiment and each Modification, the motor rotation sensor 46 is implemented as a magnetic sensor, but the present invention is not limited to this configuration, and it may also be implemented as an optical sensor.

(3) In the first embodiment and each Modification, the device is configured to, when an abnormality occurs, output only various diagnosis result flags to the controller 48, which identifies a rotation information detection function unit or each constituent unit having the abnormality, based on these diagnosis result flags, but the present invention is not limited to this configuration. For example, the device may be configured to, even when an abnormality occurs, output the calculated motor rotation angles or the measured count values to the controller 48, which may compare the motor rotation angles or the count values with each other between the respective systems to perform dual abnormality diagnosis.

(4) In Modification 3 of the first embodiment, the device is configured to perform abnormality diagnosis of the MUXs and the ADCs only once every time the IG switch 62 changes from OFF to ON, but the present invention is not limited to this configuration, and it may be configured to continuously or periodically perform such abnormality diagnosis even in ON state.

(5) In Modification 3 of the first embodiment, a plurality of types of monitoring potentials are set, but the present invention is not limited to this configuration, and only one type of monitoring potential may be set.

(6) Each of Modifications 1 to 4 of the first embodiment is not limited to an independent configuration, and they may be used in any combination.

(7) In the first embodiment and each Modification, the rotation position information input to each counter unit is defined as (sin θ, cos θ), but the present invention is not limited to this configuration as long as any rotation position information is used. Rotation position information obtained by angle calculation processing, for example, may be used.

(8) In Modification 1 of the first embodiment, in processing (to be referred to as "first determination processing" hereinafter) for determining whether or not the motor rotational speed has become equal to or higher than a set rotational speed and processing (to be referred to as "second determination processing" hereinafter) for determining whether or not the motor rotational speed has become lower than the set rotational speed while the IG switch 62 is OFF, a common set rotational speed ωt is used, but the present invention is not limited to this configuration. Different set rotational speeds may be used in the first determination processing and the second determination processing, such as using a first set rotational speed ωt1 in the first determination processing and a second set rotational speed ωt2 different from the first set rotational speed ωt1 in the second determination processing.

(9) In the first embodiment and each Modification, each of the first rotation position information detection unit 46b and the second rotation position information detection unit 46c includes two magnetic detection elements which detect magnetic signals out of phase with each other, but the present invention is not limited to this configuration, and three or more magnetic detection elements may be used.

(10) In the first embodiment and each Modification, the present invention is applied to a column-assist electric power steering device by way of example, but the present invention is not limited to this configuration, and the present invention is also applicable to, for example, a rack- or pinion-assist electric power steering device.

(11) In the first embodiment and each Modification, the present invention is applied to a steering assist motor for an electric power steering device byway of example, but the present invention is not limited to this configuration, and the present invention is also applicable to, for example, other vehicle-mounted motors such as a motor for a power window device. Besides the vehicle-mounted motors, the present invention is also applicable to motors mounted in other devices.

This application claims priority based on Japanese Patent Application No. 2016-097215 (filed on May 13, 2016), the contents of which are incorporated by reference herein in its entirety.

While the present invention has been described above with reference to only a limited number of embodiments, the scope of claims is not limited thereto, and modifications to the embodiments based on the aforementioned disclosure will be apparent to those skilled in the art.

REFERENCE SIGNS LIST

1 . . . vehicle
3 . . . electric power steering device
44 . . . electric motor
45 . . . motor drive control device
46 . . . motor rotation sensor
47 . . . rotation detector
48 . . . controller
49 . . . motor drive circuit
50 . . . power supply control unit
51 . . . first rotation information detection function unit
52 . . . second rotation information detection function unit
61 . . . battery
62 . . . IG switch
46a . . . multipolar ring magnet
46b . . . first rotation position information detection unit
46c . . . second rotation position information detection unit
47a . . . first rotation information detection unit
47b . . . second rotation information detection unit
471a, 472a . . . first and second ADCs
471b, 472b . . . first and second diagnosis units
471c, 472c . . . first and second counter units
471d, 472d . . . first and second memory units
471e, 472e . . . first and second rotation angle calculation units
471f, 472f . . . first and second output determination units
471g, 472g . . . first and second MUXs
1471, 1473 . . . first and second rotation information diagnosis units
1472, 1474 . . . first and second MUX/ADC diagnosis units
1475, 1476 . . . first and second counters
1477, 1483 . . . first and second counter comparison units
1481, 1482 . . . third and fourth counters
1478, 1479 . . . first and second memory areas
1480, 1486 . . . first and second memory comparison units
1484, 1485 . . . third and fourth memory areas

The invention claimed is:

1. A motor drive control device comprising:
an annular or disk-shaped magnet placed on a motor rotating shaft of an electric motor to be rotatable in synchronism with the motor rotating shaft and includes at least two different magnetic poles arranged alternately in a circumferential direction;
at least two systems of rotation information detection function units each including a rotation position information detection unit configured to detect a magnetic flux of the magnet which changes depending on a rotation position of the motor rotating shaft as rotation position information, a motor rotation angle calculation unit configured to calculate a motor rotation angle based on the rotation position information detected by the rotation position information detection unit, a rotation position information diagnosis unit configured to diagnose an abnormality of the rotation position information detected by the rotation position information detection unit, and a rotation change amount measurement unit configured to measure an amount of change in the rotation position of the electric motor; and
a motor drive control unit configured to control driving of the electric motor based on the motor rotation angle output from the at least two systems of the rotation information detection function units,
wherein the rotation position information detection unit includes a plurality of sensor elements configured to detect magnetic signals out of phase with each other as the rotation position information, and
the electric motor is configured to apply a steering assist force to a steering shaft of a vehicle equipped with the motor drive control device,
the motor drive control device is configured to supply power from a battery of the vehicle to the at least two systems of the rotation information detection function units even while an ignition switch is OFF,
the rotation change amount measurement unit is configured to continuously measure the amount of change in the rotation position even while the ignition switch is OFF,
the motor drive control unit is configured to:
calculate a steering angle that is a rotation angle of the steering shaft based on the amount of change in the rotation position measured by the rotation change amount measurement unit when the ignition switch changes from OFF to ON, and calculate the steering angle based on the motor rotation angle while the ignition switch is subsequently kept ON, and control driving of the electric motor based on the calculated steering angle; and
stop, when the rotation position information diagnosis unit diagnoses at least one of the at least two systems of the rotation information detection function units as abnormal, operation of the rotation change amount measurement unit of one of the rotation information detection function units that is abnormal, and calculate the steering angle based on the amount of change in the rotation position measured by the rotation change amount measurement unit of another of the rotation information detection function units that is normal.

2. The motor drive control device according to claim 1, wherein
the rotation change amount measurement unit includes a change amount measurement unit configured to measure an amount of change in the rotation position of the electric motor based on the rotation position information detected by the rotation position information detection unit, a change amount storage unit configured to store the amount of change measured by the change amount measurement unit, and a measurement abnormality diagnosis unit configured to diagnose an abnormality of the change amount measurement unit and the change amount storage unit, and the motor drive control unit is configured to, when the measurement abnormality diagnosis unit diagnoses at least one of the at least two systems of the rotation information detection function units as abnormal, calculate the steering angle based on the amount of change output from another of the rotation information detection function units that is normal.

3. The motor drive control device according to claim 1, further including a power supply control unit configured to intermittently supply power from the battery of the vehicle to the at least two systems of the rotation information detection function units while the ignition switch is OFF.

4. The motor drive control device according to claim 3, wherein the power supply control unit is configured to make switching from a state in which the power is intermittently supplied from the battery to a state in which the power is continuously supplied from the battery, when a motor rotational speed of the electric motor that is not less than a rotational speed set in advance is detected while the ignition switch is OFF.

5. The motor drive control device according to claim 3, wherein the power supply control unit is configured to intermittently supply the power from the battery to the rotation position information detection unit, the rotation position information diagnosis unit, and the rotation change amount measurement unit in each of the at least two systems of the rotation information detection function units and cut off the power supplied to other constituent units, while the ignition switch is OFF.

6. The motor drive control device according to claim 1, wherein each of the at least two systems of the rotation information detection function units includes an A/D converter configured to convert an analog signal corresponding to the rotation position information into a digital signal, a monitoring potential signal input unit configured to input an analog monitoring potential signal to the A/D converter, and an A/D converter diagnosis unit configured to compare the monitoring potential signal converted into a digital signal by the A/D converter with a preset comparison potential to diagnose an abnormality of the A/D converter based on the comparison result.

7. An electric power steering device including the motor drive control device according to claim 1.

8. A vehicle including the electric power steering device according to claim 7.

* * * * *